US011410170B2

(12) United States Patent
Wadhwa et al.

(10) Patent No.: US 11,410,170 B2
(45) Date of Patent: Aug. 9, 2022

(54) SYSTEMS, METHODS AND COMPUTER PROGRAM PRODUCTS FOR SECURING OTPS

(71) Applicant: MASTERCARD INTERNATIONAL INCORPORATED, Purchase, NY (US)

(72) Inventors: Jitendra Singh Wadhwa, Pune (IN); Rukuma Viegas, Pune (IN); Rajesh Pralhadrao Mahalle, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 35 days.

(21) Appl. No.: 17/011,670

(22) Filed: Sep. 3, 2020

(65) Prior Publication Data

US 2021/0065165 A1 Mar. 4, 2021

(30) Foreign Application Priority Data

Sep. 4, 2019 (IN) .............................. 201911035636

(51) Int. Cl.
*G06Q 20/38* (2012.01)
*H04L 9/40* (2022.01)
*G06Q 20/40* (2012.01)
*G06Q 20/02* (2012.01)
(Continued)

(52) U.S. Cl.
CPC ......... *G06Q 20/385* (2013.01); *G06Q 20/027* (2013.01); *G06Q 20/40145* (2013.01); *G06Q 30/0185* (2013.01); *H04L 63/0838* (2013.01); *H04L 63/0861* (2013.01); *G06Q 40/02* (2013.01); *G06Q 2220/00* (2013.01)

(58) Field of Classification Search
USPC ..................................................... 705/35, 44
See application file for complete search history.

(56) References Cited

U.S. PATENT DOCUMENTS

| 2007/0011724 | A1* | 1/2007 | Gonzalez | ................ G06F 21/79 726/4 |
| 2008/0150677 | A1* | 6/2008 | Arakawa | ............ B60R 25/2018 340/5.2 |
| 2009/0172775 | A1 | 7/2009 | Mardikar et al. | |

(Continued)

OTHER PUBLICATIONS

Examination Report issued in Indian Application No. 201911035636, dated Jun. 8, 2021, 7 pages.

*Primary Examiner* — William E Rankins
(74) *Attorney, Agent, or Firm* — Talem IP Law, LLP

(57) ABSTRACT

The invention relates to methods, systems and computer program products for securing one time passwords (OTP) for use in OTP based authorization of electronic payment transactions. The invention involves transmission and display of an OTP at a user device in response to a prior determination that a user operating the user device is authorized to implement a payment transaction through a payment account associated with the payment transaction. The invention implements this through transmission to the user device associated with the identified payment account, a data message initiating a process for verification of identity of a user operating the user device. Responsive to determining that the user operating the user device is authorized to operate the payment account, displaying the OTP on the user device for implementation of the payment transaction.

17 Claims, 15 Drawing Sheets

(51) Int. Cl.
*G06Q 30/00* (2012.01)
*G06Q 40/02* (2012.01)

(56) References Cited

U.S. PATENT DOCUMENTS

| | | | |
|---|---|---|---|
| 2014/0229380 A1* | 8/2014 | Duncan | G06Q 20/40145 |
| | | | 705/44 |
| 2016/0012412 A1* | 1/2016 | Scanlon | G06Q 20/3224 |
| | | | 705/44 |
| 2019/0213585 A1 | 7/2019 | Patni et al. | |

* cited by examiner

US 11,410,170 B2

SYSTEMS, METHODS AND COMPUTER PROGRAM PRODUCTS FOR SECURING OTPS

TECHNICAL FIELD

The present invention relates to the field of electronic transactions. More specifically, the invention relates to methods, systems and computer program products for securing one time passwords (OTP) for use in OTP based authorization of electronic payment transactions.

BACKGROUND

Personal Identification Numbers (PINs) are used in connection with payment card or electronic payment account based transactions (for example at automated teller machines (ATM)/point of sale (POS) devices) for the purposes of authenticating the card holder or account holder. The underlying premise of PIN based authentication is that only an authorized person would have access to the correct PIN corresponding to a payment card or electronic payment account. Therefore, input of the correct PIN is treated as verification of the identity of the individual providing the input.

Conventionally, a static (i.e. permanent or non-changing) PIN was associated with a payment card or a payment account. The card holder or account holder would use the static PIN repeatedly across multiple transactions. Use of a static PIN has been found to pose a security risk, since the PIN could be ascertained by unauthorized third parties by multiple means. Threats include, but are not limited to, shoulder surfing, phishing, key stroke logging, packet sniffing or physical or network based techniques. Accordingly, a payment account may be subject to misuse or fraudulent activity, if the static PIN and the associated payment card/account number is known to an unauthorized third party.

A widely accepted solution to security threats presented by static PINs has been to use one-time-passwords (OTPs). The OTP is generated upon initiation of a payment transaction by a user of a payment card or a payment account. The OTP is generated by a backend server and is transmitted to an authorized user at a registered mobile number, a registered email address or any other registered identity associated with the authorized user. Upon receipt of the generated OTP, the authorized user enters the received OTP as an authentication input. The solution then matches the entered OTP with an OTP stored in a database to confirm the identity of the authorized user, whereinafter the payment transaction is authorized.

FIG. 1 illustrates a prior art system 100 that can be used for implementing OTP based electronic transactions. In system 100, an electronic transaction based on a payment card or payment account may be initiated by a user 102a through a terminal device 104 or through a user device 102b. The system 100 includes a terminal device 104, a merchant server 106, an acquirer bank server 108, a payment network 110, an issuer bank server 112 and an OTP authentication server 114a. The OTP authentication server 114a may be communicably coupled with an OTP database 114b. The user 102a may have access to user device 102b—and the user device 102b may in an embodiment comprise any terminal device having wireless capability, including any mobile communication device.

In the illustration of FIG. 1, the user 102a initiates a transaction request at the terminal device 104. The terminal device 104 communicates the transaction request to the merchant server 106. The merchant server 106 then sends the transaction request to the acquirer bank server 108. The acquirer bank server 108 may in an embodiment comprise a bank server corresponding to a bank or a bank account at which or through which the merchant requires to receive payment for the transaction under implementation.

The acquirer bank server 108 receives payment card or payment account information corresponding to the user 102a (for example, such identification may be based on information provided by the user 102a at the terminal device 104). The acquirer bank server 108 thereafter uses said payment card or payment account information to forward the transaction request to the issuer bank server 112 through the payment network 110. In an embodiment, the issuer bank server 112 comprises a bank server associated with a bank at which the user 102a holds a payment account, or with a bank that has issued a payment card to the user.

FIG. 2 illustrates a flowchart identifying method steps typically involved in executing an OTP based electronic payment transaction.

At step 202, a session between a terminal device 104 and a merchant server 106 is initiated. At step 204, a transaction request is transmitted from the terminal device 104 to the merchant server 106. At step 206, the user 102a inputs payment card information or payment account information (or other similar information) at the terminal device 104. The information input by the user 102a is then transmitted by the terminal device 104 to the merchant server 106.

At step 208, subsequent to receipt of the payment card information or payment account information at the merchant server 106, a request for an OTP may be transmitted to the OTP authentication server 114a through a communication network. The request for an OTP may be generated at any of the user device 102b, the terminal device 104 or the merchant server 106, and is transmitted to the OTP authentication server 114a.

At step 210, an OTP is generated at the OTP authentication server 114a. At step 212, the generated OTP is transmitted to the user 102a or to the user device 102b. In an embodiment, the generated OTP is transmitted to the user device 102b, and the user device 102b is identified based on an association with user 102a. This association is stored within a data repository that is capable of being accessed by the OTP authentication server 114a or by the issuer bank server 112.

At step 214, the user 102a submits the received OTP as input to the terminal device 104. The submitted OTP is then sent to the merchant server 106 over a network. At step 216, the submitted OTP is further transmitted to the OTP authentication server 114a through the payment network 110. The OTP authentication server 114a approves or rejects the requested transaction depending on whether the submitted OTP matches the OTP generated by OTP authentication server 114a. In an embodiment, the OTP authentication server 114a compares the OTP generated and OTP received that is submitted from the user device 102b and thereafter sends the results of the comparison to the issuer bank server 112. The issuer server 112 will then approve or reject the ongoing transaction based on the comparison results.

It has however been found that even OTP based authentication systems suffer from security loopholes. This is particularly found in situations where security of a device to which the OTP is transmitted (e.g. the registered mobile device) has been compromised. For example, there may be a scenario where a sniffer program or other malware is unintentionally permitted to be installed on a registered mobile device. In such a scenario, the OTPs received at the mobile device can be stealth forwarded from the registered mobile device to an unauthorized third-party device. Thereafter, the OTP may be easily recovered from the unauthorized third party device and misused. Traditional OTP systems are also susceptible to misuse when the registered mobile device of a user is lost or stolen. In this case, any third party having access to the lost or stolen device can access OTPs received on it. Yet another situation where misuse of OTP based systems arises is when an unauthorized third party spoofs the identity of an authorized account holder and changes the registered mobile number associated with an account. As a result, future OTPs get forwarded to a new device, from which an unauthorized third party obtains access to such OTPs.

There is accordingly a need for mechanisms that improve the security of existing OTP based systems—and to prevent unauthorized third parties from being able to access and misuse OTPs intended for use by an authorized account holder.

BRIEF SUMMARY

The invention relates to methods, systems and computer program products for securing one time passwords (OTP) for use in OTP based authorization of electronic payment transactions.

The invention provides a method for securing a payment transaction one-time-password (OTP). The method includes the steps of (i) receiving a request to generate an OTP for completion of a payment transaction associated with a payment account, (ii) transmitting to a user device associated with the payment account, a data message that initiates an identity verification process for verification of identity of a user operating the user device, wherein the identity verification process includes (a) receiving one or more user inputs from a user of the user device, and (b) generating an identity verification decision based on the received one or more user inputs and the identity verification process for verification of identity of the user operating the user device, wherein the identity verification decision determines whether the user of the user device is an authorized user of the payment account, and (iii) responsive to the identity verification decision confirming that the user operating the user device is the authorized user of the payment account, displaying the OTP at the user device for implementation of the payment transaction.

In a method embodiment, the identity verification process includes (i) retrieving one or more security questions associated with the payment account, (ii) transmitting the retrieved one or more security questions to the user device, (iii) receiving through the one or more user inputs, an answer to the one or more security questions, (iv) comparing the received answer against pre-stored responses to the one or more security questions, and (v) generating the identity verification decision based on results of said comparison.

In a particular embodiment of the method, (i) the received one or more user inputs provides biometric information corresponding to one or more biometric characteristics of the user operating the user device, and (ii) the identity verification process includes (a) retrieving biometric characteristics information associated with the payment account, (b) comparing the biometric information corresponding to biometric characteristics of the user operating the user device against the retrieved biometric characteristics information, and (c) generating the identity verification decision based on results of said comparison.

The biometric information corresponding to one or more biometric characteristics of the user operating the user device may in a method embodiment, correspond to information captured by one or more sensors incorporated within or coupled with the user device In another embodiment of the method, displaying the generated OTP for implementation of the payment transaction includes (a) transmitting the generated OTP to the user device, and (b) displaying the OTP on a display of the user device. In a particular embodiment, the displayed OTP information is excluded from storage within non-transitory memory of the user device. In another embodiment of the method, wherein the transmitted OTP information is stored exclusively within transitory memory of the user device. The OTP information may be subsequently deleted from one or both of transitory memory and non-transitory memory of the user device after the OTP has been displayed on the display of the user device.

In certain method embodiments, the OTP is generated or is transmitted to the user device for display (i) prior to initiation of the identity verification process, or (ii) during implementation of the identity verification process, or (iii) subsequent to the identity verification decision confirming that the user operating the user device is an authorized user of the payment account.

The invention additionally provides a system for securing a payment transaction one-time-password (OTP). The system includes a processor implemented OTP gateway server configured for (i) receiving a request to generate an OTP for completion of a payment transaction associated with a payment account, (ii) transmitting to a user device associated with the payment account, a data message that initiates an identity verification process for verification of identity of a user operating the user device, wherein the identity verification process includes (a) receiving one or more user inputs from a user of the user device, and (b) generating an identity verification decision based on the received one or more user inputs and the identity verification process for verification of identity of the user operating the user device, wherein the identity verification decision determines whether the user of the user device is the authorized user of the payment account, and (iii) responsive to the identity verification decision confirming that the user operating the user device is an authorized user of the payment account, displaying the OTP at the user device for implementation of the payment transaction.

In a system embodiment, the identity verification process includes (i) retrieving from a security server associated with an issuer of the payment account, one or more security questions associated with the payment account, (ii) transmitting the retrieved one or more security questions to the user device, (iii) receiving through the one or more user inputs, an answer to the one or more security questions, (iv) comparing the received answer against pre-stored responses to the one or more security questions that are retrieved from the security server, and (v) generating the identity verification decision based on results of said comparison.

In a further system embodiment, the received one or more user inputs provides biometric information corresponding to one or more biometric characteristics of the user operating the user device, and the identity verification process includes (i) retrieving from a biometric authentication server associated with an issuer of the payment account, biometric characteristics information associated with the payment account, (ii) comparing the biometric information corresponding to biometric characteristics of the user operating the user device against the biometric characteristics information retrieved from the biometric authentication server, and (iii) generating the identity verification decision based on results of said comparison.

In another system embodiment, the biometric information corresponding to one or more biometric characteristics of the user operating the user device corresponds to information captured by one or more sensors incorporated within or coupled with the user device.

The system may be configured such that displaying the OTP generated for implementation of the payment transaction includes (i) transmitting OTP information to the user device, and (ii) displaying the OTP on a display of the user device. The transmitted OTP information may be excluded from storage within non-transitory memory of the user device. In another system embodiment, the transmitted OTP information is stored exclusively within transitory memory of the user device. The OTP information may in certain embodiments be subsequently deleted from one or both of transitory memory and non-transitory memory of the user device after the OTP has been displayed on the display of the user device.

In certain system embodiments, the OTP is generated or is transmitted to the user device for display (i) prior to initiation of the identity verification process, or (ii) during implementation of the identity verification process, or (iii) subsequent to the identity verification decision confirming that the user operating the user device is an authorized user of the payment account.

The invention also provides a computer program product for securing a payment transaction one-time-password (OTP). The computer program product includes a non-transitory computer usable medium having computer readable program code embodied therein, the computer readable program code including instructions for implementing the steps of (i) receiving a request to generate an OTP for completion of a payment transaction associated with a payment account, (ii) transmitting to a user device associated with the payment account, a data message that initiates an identity verification process for verification of identity of a user operating the user device, wherein the identity verification process includes (a) receiving one or more user inputs from a user of the user device, and (b) generating the identity verification decision based on the received one or more user inputs and on an identity verification process for verification of identity of the user operating the user device, wherein the identity verification decision determines whether the user of the user device is an authorized user of the payment account, and (iii) responsive to the identity verification decision confirming that the user operating the user device is the authorized user of the payment account, displaying the OTP at the user device for implementation of the payment transaction.

DETAILED DESCRIPTION

Figure 1:
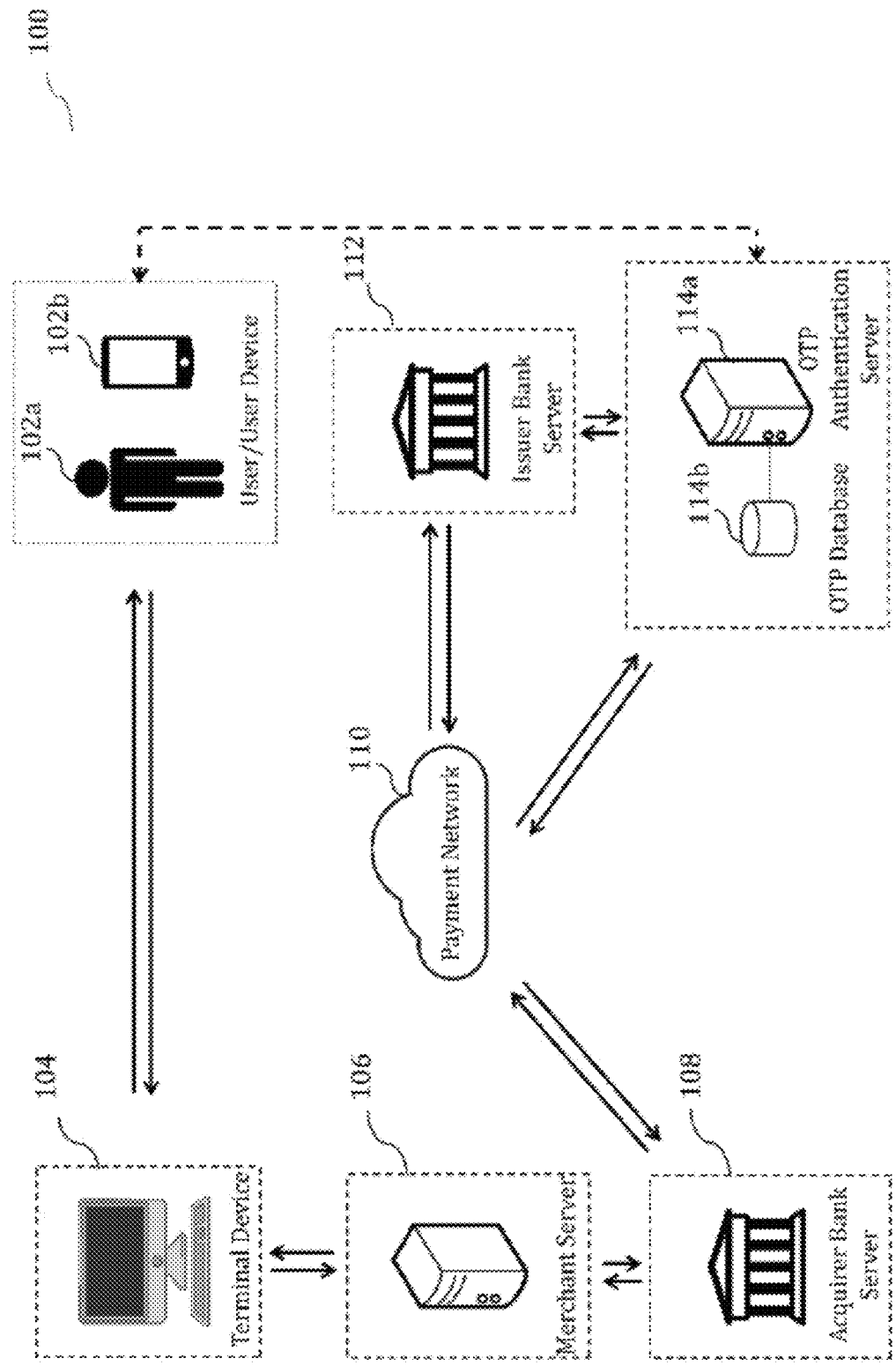
FIG. 1 illustrates a system environment and system entities involved in OTP based transaction authentication, with the communication flow between such entities.
Figure 2:
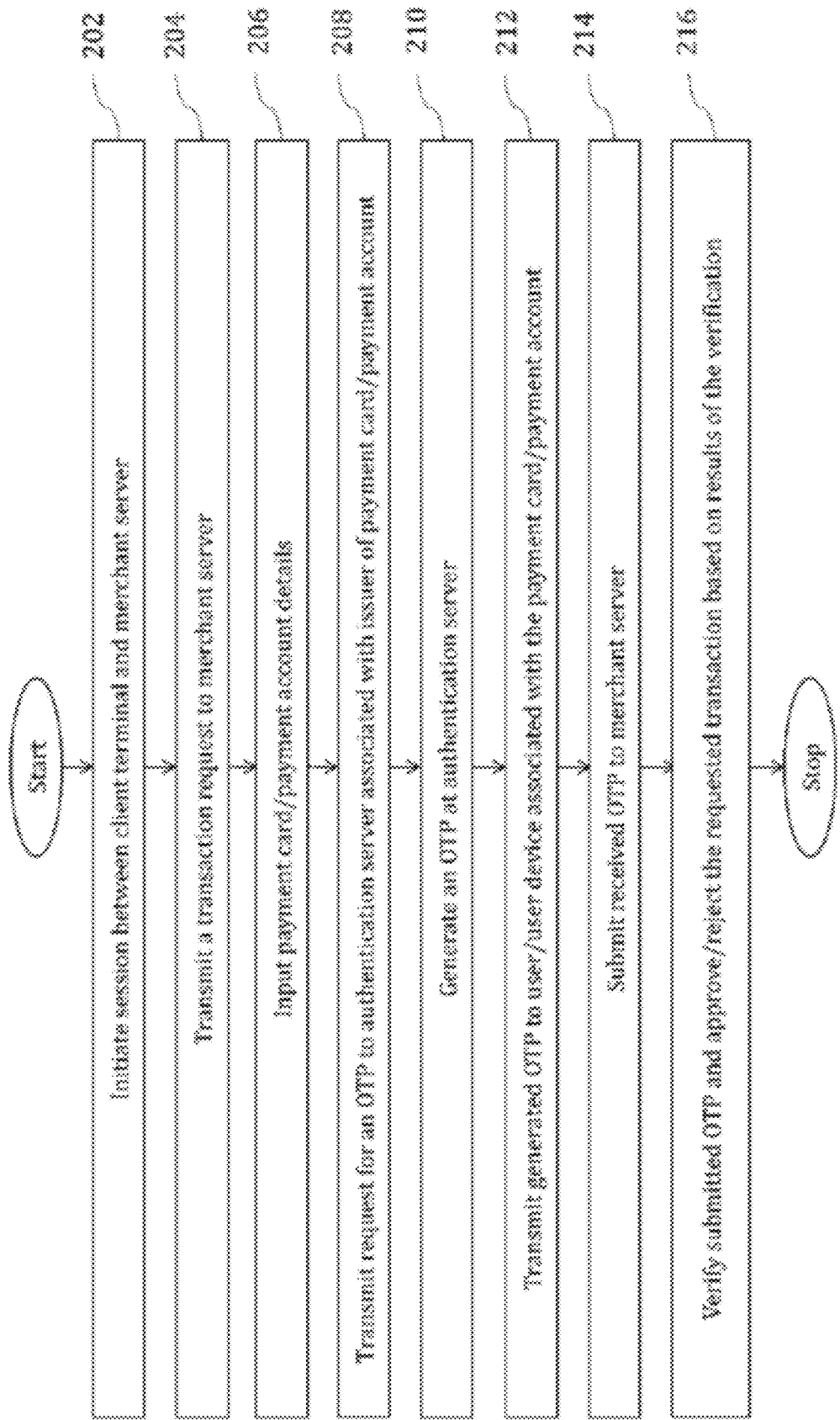
FIG. 2 is a flow chart illustrating a conventional method for OTP based transaction authentication.

The present invention provides systems, methods and computer program products for secured OTP transmission and display for implementing electronic payment transactions. The invention presents improvements to the arrangements and methods described in connection with FIGS. 1 and 2 above, so as to prevent unauthorized access to, misappropriation of and/or misuse of OTPs.

For the purposes of the present invention, the following terms shall be understood to have the corresponding meanings provided below.

"Acquirer" shall mean a business (e.g., a financial institution or a merchant bank) that contracts with a merchant to coordinate with the issuer network of a customers' payment card or payment account.

"Acquirer bank server" shall refer to one or more servers, including hardware, software and other equipment used by an acquirer to transmit and process payment card based transactions or payment account based transactions and information related to merchants, customers, payment cards, payment accounts and/or transactions.

"Card holder" or "Account Holder" shall mean an authorized payment card user or an authorized user of a payment account who is making a purchase or effecting an electronic transaction with a payment card or a payment account.

"Issuer" shall mean a financial institution that issues payment cards or payment accounts to users.

Issuer bank server" shall refer to one or more servers, including hardware, software and other equipment used by an issuer to transmit and process payment card transactions or payment account transactions and information related to customers, payment cards, payment accounts and/or transactions.

"Merchant" shall mean an authorized acceptor of payment cards or payment from a payment account for the payment of goods or services sold by the merchant.

"Merchant server" shall refer to one or more servers, including hardware, software and other equipment used by a merchant to transmit and process payment card transactions or payment account transactions and information related to customers, payment cards, payment accounts and/or transactions.

"Payment account" shall mean any account that may be used for the purposes of effecting an electronic payment or electronic transaction, and shall include any electronic transaction account, payment card account, bank account or electronic wallet account.

"Payment card" shall mean a card or data associated with a payment account that may be provided to a merchant in order to fund a financial transaction via the associated payment account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated payment account (e.g., as stored in a communication device, such as a smart phone or computer). For example, in some instances, data including a payment account number may be considered a payment card for the processing of a transaction funded by the associated payment account. In some instances, a check may be considered a payment card where applicable.

"Payment network" shall refer to any intermediary network communicatively disposed between any two or more of the merchant server, acquirer bank server and issuer bank server. In certain embodiments, the payment network may comprise a card network that enables communication between the issuer bank and the acquirer bank (for example, Mastercard®, Visa®, or RuPay®). In such embodiments, the card network primarily coordinates payment card transactions between acquirers and issuers, and additionally coordinates clearing and settlement services to transfer payments from issuers to merchants.

Figure 3:
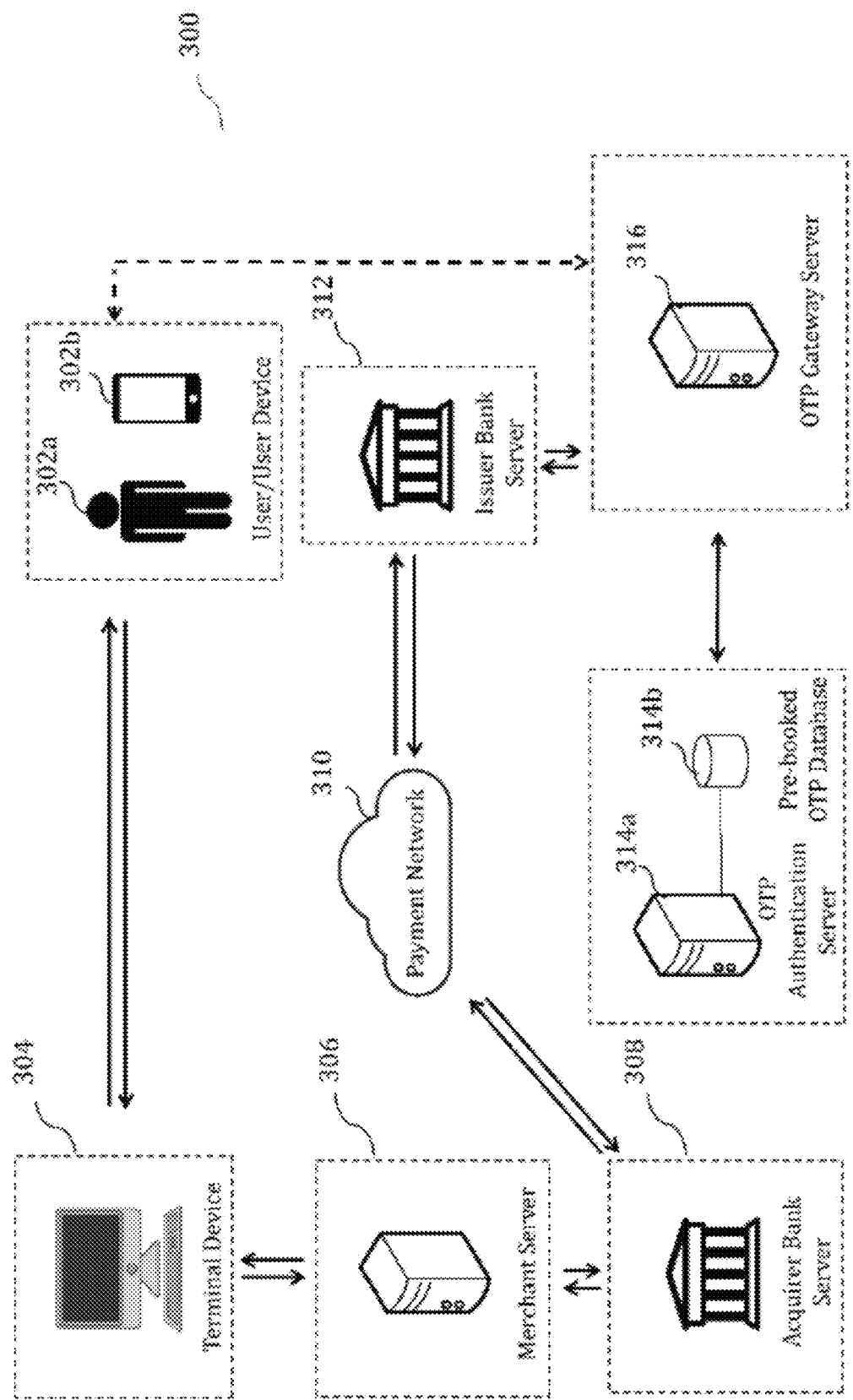
FIG. 3 illustrates a system environment configured to implement OTP based transaction authentication in accordance with the present invention.

FIG. 3 illustrates a system environment 300 configured to implement OTP based transaction authentication in accordance with the present invention. The system environment 300 can be used for implementing a secure OTP based system—to prevent unauthorized third parties from accessing and misusing OTPs that are intended for use by an authorized account holder.

In the system environment 300, an electronic transaction based on a payment card or payment account may be initiated by a user 302a through a terminal device 304. The system environment 300 includes the terminal device 304, a merchant server 306, an acquirer bank server 308, a payment network 310, an issuer bank server 312, an OTP authentication server 314a and an OTP gateway server 316. The OTP authentication server 314a may be communicably coupled with an OTP database 314b. The user 302a may have access to the user device 302b. The user device 302b may in an embodiment comprise any terminal device having wireless capability, including any mobile communication device. In a particular embodiment, the user device 302b and the terminal device 304 may comprise the same device. The OTP gateway server 316 is positioned as a gateway device or access control device between the user device 302b and the OTP authentication server 314a. The OTP gateway server 316 is configured to control transfer of OTP data between the OTP authentication server 314a and the user device 302b for securing such OTP data in accordance with the teachings of the present invention.

In the illustration of FIG. 3, the user 302a initiates a transaction request at the terminal device 304. The transaction request includes a request for implementing a selected transaction through the merchant server 306. The terminal device 304 communicates the transaction request to the merchant server 306. The transaction request is communicated onward from the merchant server 306 to the acquirer bank server 308. The acquirer bank server 308 may in an embodiment comprise a bank server corresponding to a bank or a bank account at which or through which the merchant requires to receive payment for the transaction under implementation.

The acquirer bank server 308 receives payment card or payment account information corresponding to the user 302a. In an example, the payment card or payment account information is input by the user 302a through the terminal device 304. The acquirer bank server 308 thereafter uses the payment card or payment account information to forward the transaction request to the issuer bank server 312 through or over the payment network 310. In an embodiment, the issuer bank server 312 is a bank server associated with a bank at which the user 302a holds a payment account, or with a bank that has issued a payment card to the user 302a. Responsive to receiving the transaction request, and in accordance with its defined OTP security policies, the issuer bank server 312 transmits an instruction for OTP generation to the OTP gateway server 316. The OTP gateway server 316 thereafter controls the OTP generation and transmission process. The OTP gateway server 316 ensures that an OTP generated by the OTP authentication server 314a is transmitted to the user 302a at the user device 302b in a secure manner. Transmission of the OTP in a secure manner prevents misappropriation of, or unauthorized access to, the generated OTP—and ensures that the generated OTP is used only for transaction authorization by the legitimate account holder or card holder. The transmission of OTP in a secure manner is further explained in conjunction with FIGS. 4 to 9.

Figure 4:
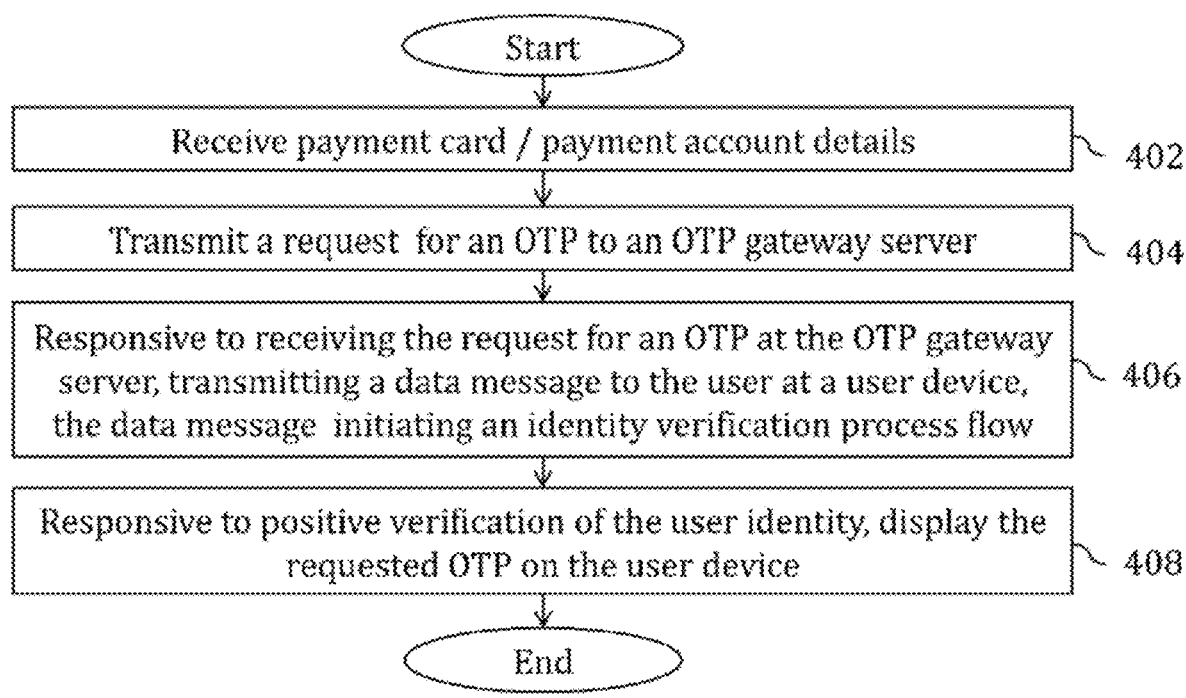
FIG. 4 is a flow chart illustrating a method for OTP based transaction authentication in accordance with the present invention.

FIG. 4 illustrates a flowchart identifying method steps involved in executing an OTP based electronic payment transaction within system environment 300.

Payment card or payment account information for a payment card or payment account that is intended to be used for a payment transaction, is received at step 402. The payment card or payment account information may be received from the user 302a. The user 302a inputs such information at the terminal device 304 in connection with a payment transaction that is being initiated from the terminal device 304. The inputs may be transmitted from the terminal device 304 to the merchant server 306. As discussed above, in an embodiment of the invention, the terminal device 304 and the user device 302b are the same device.

At step 404 a request for OTP generation is transmitted to the OTP gateway server 316. The request for OTP generation may be transmitted directly or indirectly from any one or more of the merchant server 306, the acquirer bank server 308, the payment network 310, and/or the issuer bank server 312, to the OTP gateway server 316.

At step 406, responsive to the request for OTP generation being received at the OTP gateway server 316, said OTP gateway server 316 initiates transmission of a data message to user device 302b. The transmission of the data message to user device 302b initiates an identity verification process flow. The identity verification process flow ensures that the user 302a is an individual/entity that is authorized to make payment transactions through the payment card or payment account identified at step 402. In other words, the identity verification process flow determines whether the user 302a is the card holder or account holder associated with such payment card or payment account. In an embodiment of the invention, the user device 302b is a device that is identified based on a device identifier or device address that has been associated with the card holder or account holder in the records of the issuer. In an example, the user device 302b is a registered mobile device or a mobile device or computing device that is running a registered instance of a software application associated with the card holder or account holder in the records of the issuer. In an embodiment of the invention, the transmission at step 406 comprises transmitting a short-message-service (SMS) communication, flash message, USSD message or other message notifying the user 302a that a request for OTP generation has been received for a payment card or payment account associated with the user 302a. The data message invites the user 302a to complete an identity verification process to access the requested OTP. In an example, the transmitted data message at step 406 is message according to or along the lines of the following exemplary message template:

"TO ACCESS YOUR OTP FOR A TRANSACTION FOR AN AMOUNT OF [INSERT AMOUNT] with [INSERT MERCHANT NAME]—PLEASE [INSERT DESCRIPTOR OF ACTION THAT USER REQUIRES TO TAKE TO COMPLETE THE IDENTITY VERIFICATION PROCESS]"

The action(s) that the user 302a requires to take to participate in the identity verification process may include any detectable action or event that may be initiated through the user device 302b. An example of a detectable action is where the user 302a presses a specific key or button or specific portion of a touchscreen on the user device 302b. In the example, the pressing of the specific key, button or portion of the touchscreen could be a shortpress or longpress event implemented through the user device 302b. In another example, the detectable action may comprise sending of a reply SMS, flash message, or USSD message (or other data message) from the user device 302b.

Embodiments of the identity verification process flow of step 406 are discussed in more detail in connection with FIGS. 6 to 9 below.

At step 408, responsive to a positive verification of identity of the user 302a, the OTP corresponding to the ongoing payment transaction is displayed on the user device 302b. Positive verification of identity of the user 302a, involves determining that the user 302a that is operating the user device 302b is a user who is authorized to carry out payment transactions through the payment card or payment account identified at step 402. The positive verification of identity of the user 302a may be determined subsequent to the user 302a taking the necessary action(s) to participate in the identity verification process of step 406. The OTP displayed on the user device 302b can thereafter be used by the user 302a in the regular course for completing the ongoing payment transaction (for example, in accordance with the methods more generally described in connection with FIG. 2 above). The OTP displayed at step 408 may be an OTP that has been generated for the transaction by the OTP authentication server 314a. The generated OTP may be retrieved by the OTP gateway server 316 for onward transmission to the user device 302b. Alternatively, the generated OTP may be transmitted from the OTP authentication server 314a to the user device 302b pursuant to an OTP transmission instruction received from the OTP gateway server 316—in response to a positive verification of identity of the user 302a.

In an embodiment of the invention, the OTP that is displayed on the user device 302b at step 408 is displayed graphically on a display screen of the user device 302b, (i) without being stored in the non-volatile/non-transitory memory of the user device 302b and/or (ii) while being stored exclusively within the volatile/transitory memory of the user device 302b. In an embodiment, this may be achieved by an interface controller within the user device 302b which is configured such that OTPs received from the OTP gateway server 316 or the OTP authentication server 314a (or any other data source) are only handled within volatile/transitory memory of user device 302b. This enables the OTP to be displayed on the display screen of the user device 302b without storing the OTP data in the non-volatile/non-transitory memory of user device 302b and prevents unauthorized access to OTP data received at the user device 302b (for example, through a sniffer program or other malware).

In an embodiment, the interface controller within the user device 302b may be configured to delete OTP data corresponding to an OTP that has been displayed on a display screen of user device 302b from one or both of volatile memory (transitory memory) and/or non-volatile memory (non-transitory memory) of the user device 302b. The deletion of OTP data may be implemented after the OTP has been displayed on the display screen (for example, after elapse of a predefined amount of time from when the OTP is displayed on the display screen).

In an alternative embodiment, an encrypted OTP is transmitted to the user device 302b in response to the request for generation of the OTP. Responsive to a positive verification of identity of the user 302a, a decryption key and/or an instruction to decrypt the encrypted OTP is transmitted at step 408 to the user device 302b. Upon receiving the decryption key/instruction for decryption, the user device 302b decrypts the encrypted OTP and displays the OTP corresponding to the ongoing payment transaction on the user device 302b—which OTP can thereafter be used by the user 302a in the regular course for completing the ongoing payment transaction.

In another embodiment, a masked OTP, pixelated OTP, encoded OTP, or any other representation of an OTP that does not allow the user 302a to correctly read the OTP, is transmitted to the user device 302b in response to the request for generation of the OTP. Responsive to a positive verification of identity of the user 302a, an unmasked, unencoded and/or fully readable OTP is transmitted to the user device 302b. The user device 302b thereafter displays the unmasked, unencoded and/or fully readable OTP corresponding to the ongoing payment transaction on a display—which OTP can thereafter be used by the user 302a in the regular course for completing the ongoing payment transaction.

Figure 5:
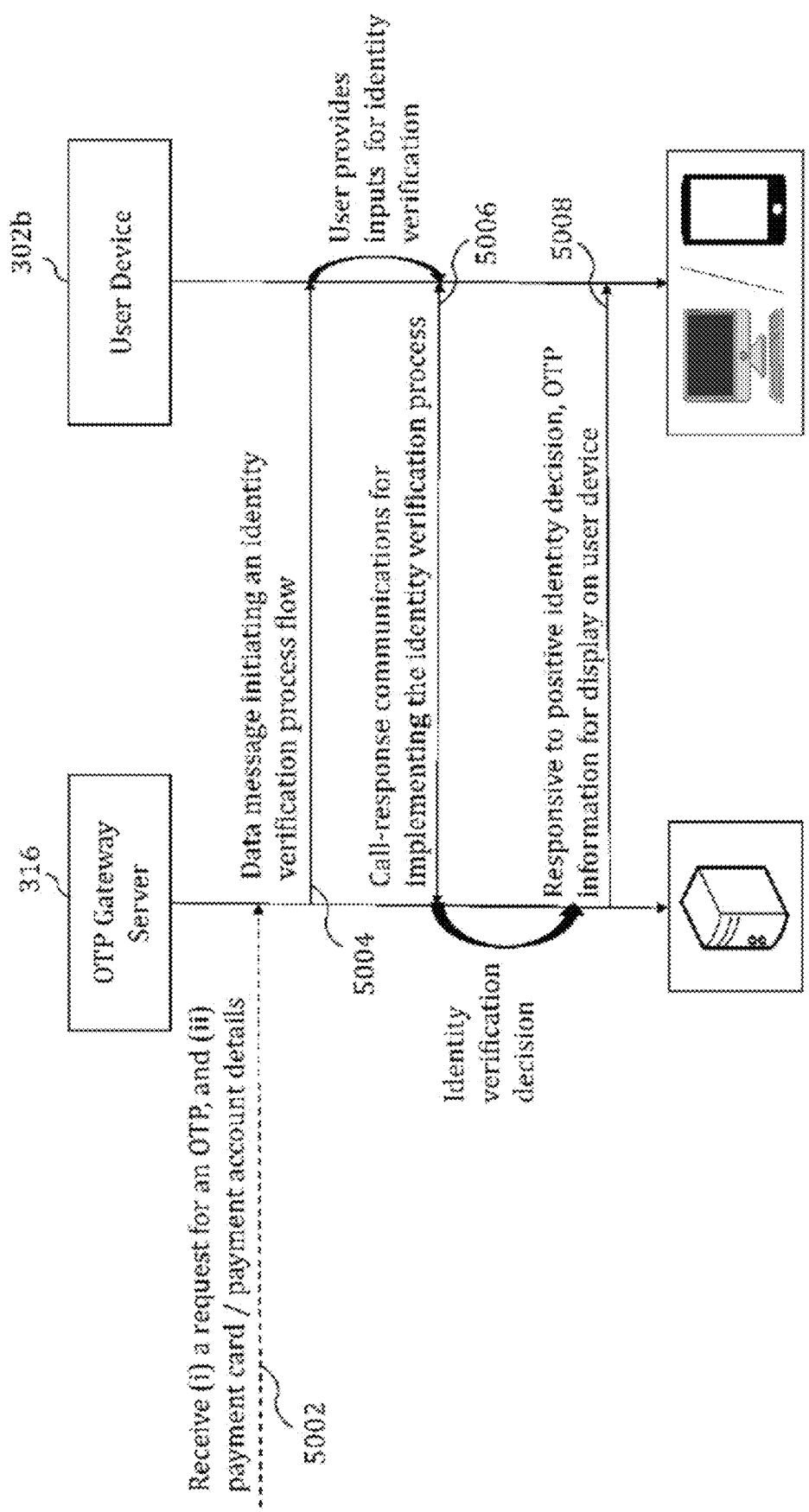
FIG. 5 is a communication flow diagram illustrating communication flow between system entities for implementing a method for OTP based transaction authentication in accordance with the present invention.

FIG. 5 is a communication flow diagram illustrating communication flow between the above discussed system entities for implementing the method of FIG. 4.

At step 5002, the OTP gateway server 316 receives a request for generation of an OTP along with payment card or payment account information corresponding to a payment card or payment account that is intended to be used for a payment transaction. In an embodiment, the payment card or payment account information is entered by the user 302a through the terminal device 304. In another embodiment, the payment card or payment account information is entered by the user 302a through the user device 302b. The received information may be transmitted to the OTP gateway server 316 along with the request for an OTP through the merchant server 306 (and optionally through one or more of the acquirer bank server 308, the payment network 310 and the issuer bank server 312).

At step 5004, responsive to receiving the request for OTP generation, the OTP gateway server 316 initiates transmission of a data message to the user device 302*b*. The data message initiates an identity verification process flow for ensuring that the user 302*a* is in fact an individual/entity that is authorized to make payment transactions through the payment card or payment account identified at step 5002. As discussed in connection with FIG. 4, in an embodiment of the invention, the data transmission at step 5004 comprises a short-message-service (SMS) communication, Class 0 text message, a flash message, Unstructured Supplementary Service Data (USSD) message or other data communication message notifying the user 302*a* that a request for OTP generation has been received in connection with a payment card or payment account associated with the user 302*a*. The data message may also invite the user 302*a* to complete an identity verification process to receive the requested OTP.

The user 302*a* thereafter takes the necessary actions to participate in the identity verification process. Subsequent thereto, step 5006 involves one or more call-response communications between the user device 302*b* and the OTP gateway server 316 for implementing an identity verification process. The identity verification process determines whether the user 302*a* is authorized to carry out payment transactions through the payment card or payment account identified at step 5002.

As illustrated in FIG. 5, an identity verification decision is generated based on the identity verification process. At step 5008, responsive to a positive identity decision (i.e. responsive to determining that the user 302*a* is authorized to carry out payment transactions through the payment card or payment account identified at step 5002), an OTP corresponding to the ongoing payment transaction is transmitted for display on the user device 302*b*. The OTP can thereafter be used by the user 302*a* in the regular course for completing the ongoing payment transaction. The OTP transmitted for display at step 5008 may be an OTP that has been generated for the transaction by the OTP authentication server 314*a*. The generated OTP may be either retrieved by the OTP gateway server 316 for onward transmission to the user device 302*b*, or may be transmitted directly from the OTP authentication server 314*a* to the user device 302*b*. Additionally, as discussed above, the OTP transmitted for display on the user device 302*b*, may at step 5008 be displayed graphically on a display screen of the user device 302*b* through one of many ways. For example, the OTP is displayed (i) without being stored in the non-volatile/non-transitory memory of the user device 302*b* and/or (ii) while being stored exclusively within the volatile/transitory memory of the user device 302*b* and/or (iii) may be subsequently deleted from one or both or volatile memory (transitory memory) and/or non-volatile memory (non-transitory memory) of the user device 302*b* after the OTP has been displayed on a display screen of the user device 302*b*. In an example, the OTP is deleted from one or both or volatile memory and/or non-volatile memory of the user device 302*b* after elapse of a predefined amount of time from when the OTP is displayed on the display screen.

As discussed above, the identity verification process that is implemented through the call-response communications of step 5006 may comprise any one of several different identity verification processes. Particular embodiments and examples of the methods of FIGS. 4 and 5 are discussed in more detail in connection with FIGS. 6 to 9 below.

Figure 6:
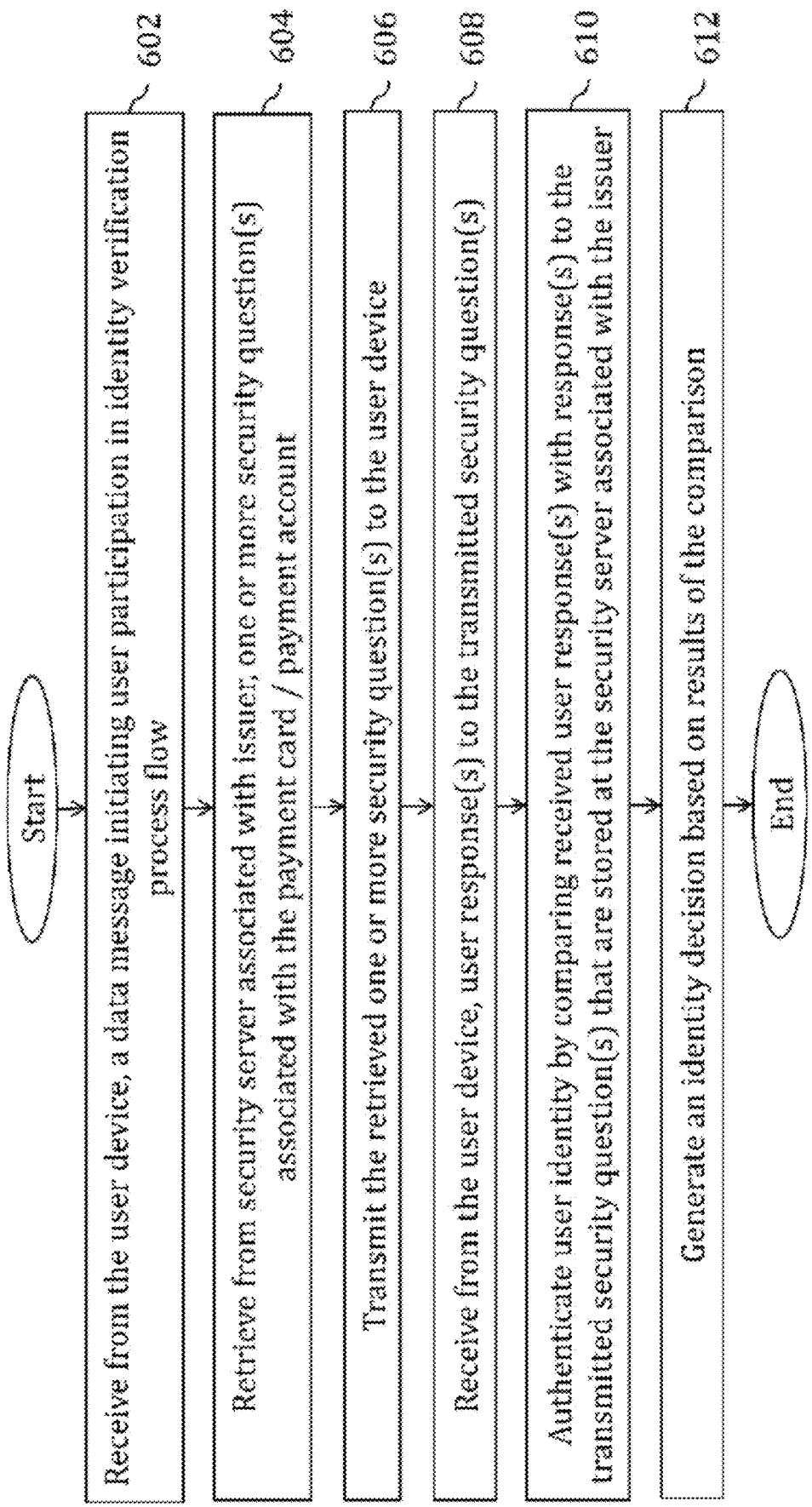
FIG. 6 is a flow chart illustrating a method for implementing a first identity authentication process flow in accordance with the present invention.

FIG. 6 illustrates a first identity verification process flow that may be used for implementing the teachings of FIG. 4 and/or FIG. 5. The identity verification process flow of FIG. 6 relies on security question-answer data that has been associated by an issuer bank server (or issuer bank) with a payment card/payment account that is being used for implementing a payment transaction.

At step 602, a data message initiating user participation in the identity verification process flow is received from the user device 302*b*. As discussed in connection with FIG. 4 above, the data message initiating user participation in the identity verification process flow may be initiated at the user device 302*b* by any detectable action or event that may be initiated by the user 302*a*. Detectable actions include without limitation, the user 302*a* pressing a specific key or button or specific portion of a touchscreen on the user device 302*b*, a shortpress or longpress event implemented through user device 302*b*, sending an SMS, flash message, USSD message, or other data message from the user device, 302*b*, etc. The detectable action may be initiated by the user 302*a* in response to a data message previously transmitted to the user device 302*b* from the OTP gateway server 316 (for example through SMS, flash message, USSD message, or any other data message protocol) notifying the user 302*a* that a request for OTP generation has been received in connection with a payment card or payment account associated with user 302*a*. The data transmission may additionally invite the user 302*a* to complete an identity verification process (see for example, step 406 of FIG. 4).

At Step 604 one or more security questions that have been associated by an issuer institution (e.g. an issuer bank) with a payment card/payment account that is being used for implementing a payment transaction are retrieved from an issuer server. In exemplary embodiments, the issuer server may be an issuer bank server 312 or a security server associated with or communicably coupled with issuer bank server 312.

It would be understood that registration of security questions (and corresponding answers) form part of an identity verification process that is used by issuers. The identity verification process ensures that a user who is seeking to access services of the issuer in connection with a payment card or a payment account is the authorized card holder or account holder for that payment card or payment account. Issuers implement this process by associating one or more security questions and their corresponding correct answers, with a user when onboarding the user into the system or when creating a payment card or payment account for the user. The security questions and responses are usually of a kind where the responses to the security questions are likely to only be known to the authorized user of the payment card or payment account. For the purposes of identity verification, a user seeking to access the payment card or payment account is presented with the security questions, and the responses received from the user are compared with the pre-stored responses. If the responses match, a positive identity decision (i.e. identity confirmation decision) is generated. If the responses do not match, a negative identity decision (i.e. identity "not confirmed" decision) is generated.

At step 606, the retrieved one or more security questions are transmitted to the user device 302*b* for identity verification of the user 302*a*.

At step 608, user responses to the transmitted security question(s) are received from the user device 302*b*. The user responses may be received by way of user input at the user device 302*b* and may be transmitted back to the OTP gateway server 316 or to the issuer bank server 312 (for example, through the OTP gateway server 316).

At step 610, the identity of the user 302*a* is authenticated by comparing the user responses to the security question(s) that are received from the user device 302*b*, with responses to the security question(s) that are stored at the issuer bank server 312. The comparison may be carried out at any of the OTP gateway server 316, the issuer bank server 312 or a security server associated or communicably coupled with the issuer bank server 312.

At step 612 an identity decision is generated based on results of the comparison at step 610. As discussed above, if the responses to the security question(s) presented to the user 302*a* through the user device 302*b* match the pre-stored responses to said security question(s), a positive identity decision (i.e. identity confirmation decision) is generated. However, if the responses to the security question(s) do not match, a negative identity decision (i.e. identity not confirmed decision) is generated.

It would be understood that in the event of a positive identity decision generated at step 612 as a result of the identity verification process flow of FIG. 6, the OTP gateway server 316 would initiate display of an OTP corresponding to a requested payment transaction on the user device 302*b* (as discussed above in connection with step 408 of FIG. 4).

In a particular embodiment of the method of FIG. 6, the data message transmitted at step 602 (for example, SMS, flash message, USSD message, or pop-up message) (i) includes a masked OTP and (ii) that invites the user 302*a* to complete an identity verification process to access the masked OTP. In an example, the transmitted data message according to or along the lines of the following exemplary message template:

"YOUR OTP IS [XXXX]. TO ACCESS YOUR OTP—PLEASE [INSERT DESCRIPTOR OF ACTION THAT USER REQUIRES TO TAKE TO COMPLETE THE IDENTITY VERIFICATION PROCESS]"

Thereafter, in the event of a positive identity decision generated at step 612 as a result of the identity verification process flow of FIG. 6, the OTP gateway server 316 would initiate replacing (or otherwise superimposing) the masked OTP displayed on the user device 302*b* with the actual OTP corresponding to a requested payment transaction on the user device 302*b* (as discussed above in connection with step 408 of FIG. 4).

In another embodiment of the method of FIG. 6, the data message at step 602 (for example, a SMS, flash message, USSD message, or pop-up message) (i) includes a masked OTP and (ii) invites the user 302*a* to complete an identity verification process to access the masked OTP. In an example, the transmitted data message at step 602 is an SMS according to or along the lines of the following exemplary message template:

"YOUR OTP IS [XXXX]. TO ACCESS YOUR OTP—PLEASE PLEASE [INSERT DESCRIPTOR OF ACTION THAT USER REQUIRES TO TAKE TO COMPLETE THE IDENTITY VERIFICATION PROCESS]"

Thereafter, in the event of a positive identity decision generated at step 612 as a result of the identity verification process flow of FIG. 6, the OTP gateway server 316 initiates transmission of a second data message for display on the user device 302*b*. The second data message includes the actual OTP corresponding to a requested payment transaction on the user device 302*b* (as discussed above in connection with step 408 of FIG. 4)—thereby enabling display of the actual OTP on the user device 302*b*.

The method of FIG. 6 and its implementation within the method of FIG. 4, may be further understood in connection with the example of a purchaser seeking to implement a payment transaction for purchase of a smartphone through an online merchant website using a payment account bearing payment account identifier number "ABCD".

The purchaser initiates a payment workflow by providing to a merchant server, (i) a payment instruction to initiate payment of a specific transaction amount to the merchant, and (ii) payment account information. The payment account information may be input by the purchaser at a terminal device (e.g. terminal device 304) through which the online merchant website is being accessed. In this example, the payment account information input at the terminal device consists of the payment account identifier "ABCD" and optionally, a bank identifier that uniquely identifies an issuer bank with which the payment account is maintained. It would be understood that in certain embodiments, the bank identifier may comprise a part of the payment account identifier itself.

The payment instruction along with the payment account information may be transmitted to the issuer bank (e.g. issuer bank server 312) via one or more of a merchant server (e.g. merchant server 306), an acquirer bank server (acquirer bank server 308), and a network (e.g. payment network 310). Upon receipt of the payment instruction the issuer bank initiates a process flow for OTP generation—and transmits a request for OTP generation to an OTP gateway server (e.g. OTP gateway server 316).

The OTP gateway server responds to receiving the request for OTP generation by transmitting to a registered mobile device (e.g. user device 302*b*) associated with payment account "ABCD", a data message initiating an identity verification workflow. The data message comprises the following text by way of an SMS, flash message, USSD message or pop-up message, that is presented on a display of the registered mobile device:

"WE HAVE RECEIVED A PAYMENT INSTRUCTION ASSOCIATED WITH YOUR PAYMENT ACCOUNT. DO YOU WISH TO PROCEED WITH IDENTITY VERIFICATION.
IF YES TAKE ACTION "A". IF NO TAKE ACTION "B".

Responsive to the user (e.g. user 302*a*) who is operating registered mobile device deciding to proceed with the identity verification process, such user would initiate action "A" at the registered mobile device—for example, pressing a "Yes" or "Continue" button, or any other action signifying consent. If the user initiates action "A", the OTP gateway server next retrieves from the issuer bank server a security question and response associated with payment account ABCD. In this example, the retrieved security question is "WHAT WAS YOUR FIRST PET'S NAME" and the response corresponding to this security question that is also retrieved is "CHEWBACCA". The OTP gateway server then transmits to the registered mobile device, a data message comprising the following text by way of an SMS, flash message, USSD message or pop-up message, for display of the registered mobile device, in the manner illustrated in the exemplary user interface shown in FIG. 10B:

YOUR OTP IS [XXXX] . . . .
TO VIEW YOUR OTP—PLEASE ANSWER THE FOLLOWING SECURITY QUESTION . . . .
[WHAT WAS YOUR FIRST PET'S NAME?]

It will be noted that the actual OTP is not displayed within the message, and [XXXX] within the data message is simply a masked OTP, pixelated OTP, encoded OTP, encrypted OTP or any other representation of an OTP that does not allow a viewer to correctly or fully read the OTP.

Figure 10A:
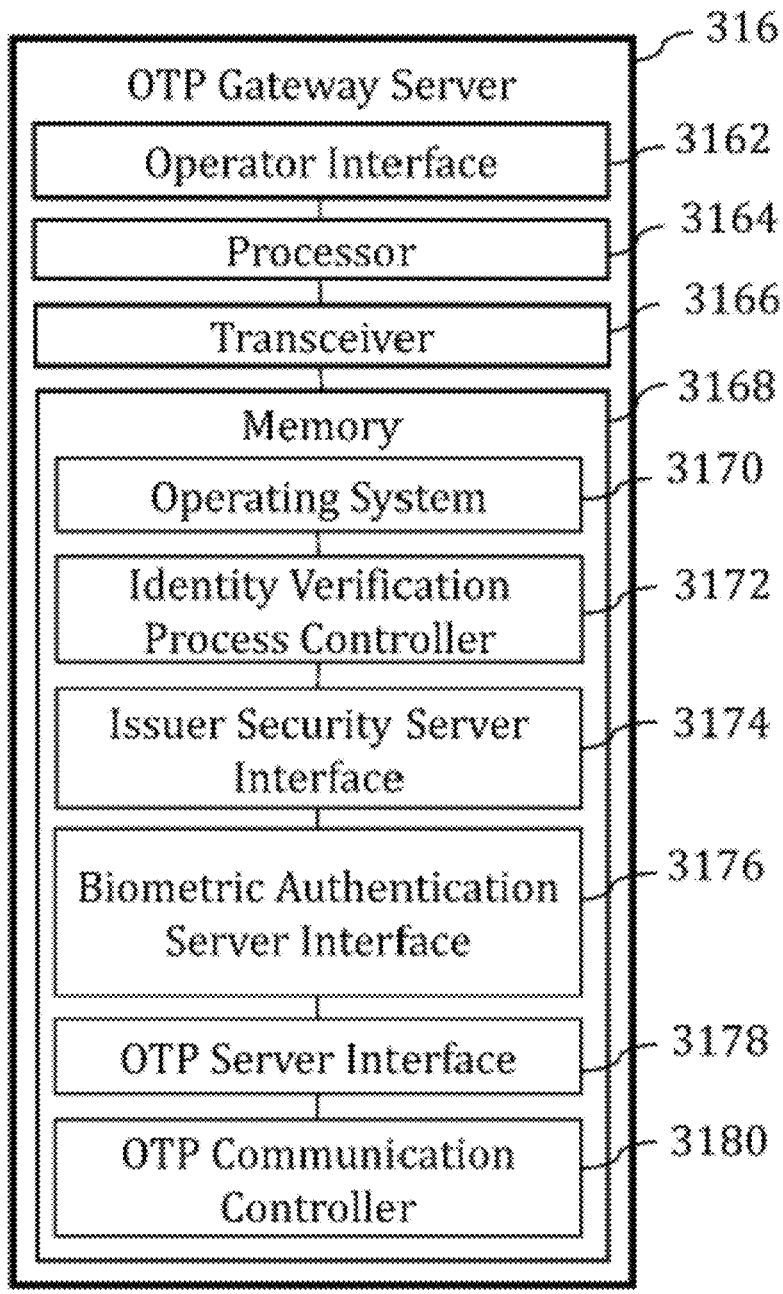
FIG. 10A illustrates an exemplary embodiment of an OTP gateway server configured in accordance with the teachings of the present invention.
Figure 10B:
FIGS. 10B to 10H illustrate exemplary user interfaces for a user device configured to display an OTP in accordance with the teachings of the present invention.
Figure 10C:
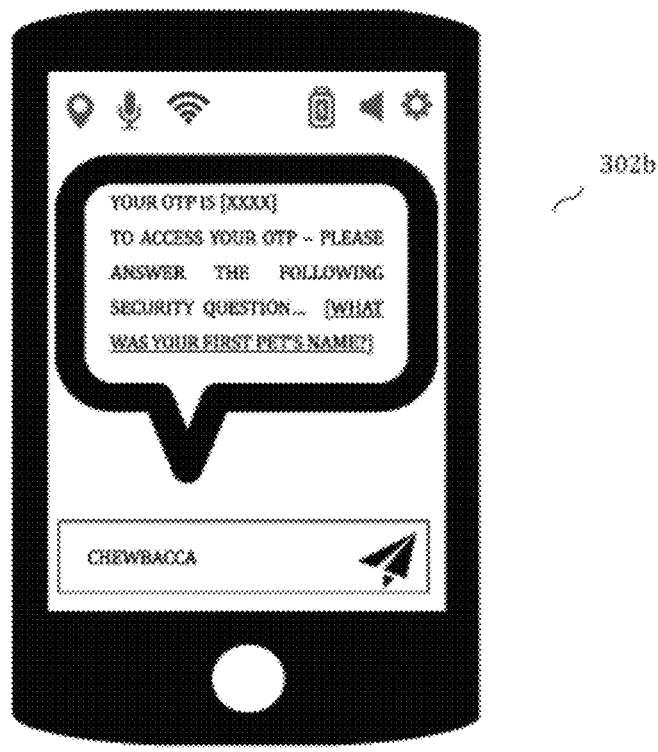
Figure 10D:
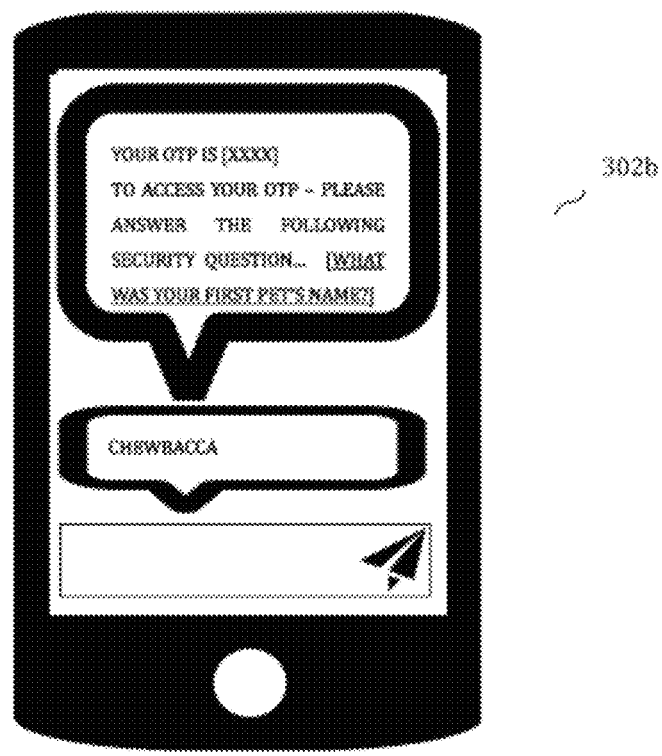

The user operating the registered mobile device responds to this data message in the manner illustrated in the exemplary user interface shown in FIG. 10C, by inputting into a reply data message, an answer to the security question. In the illustrated instance, the answer input by the user is "CHEWBACCA". The reply data message is transmitted back to the OTP gateway server—as shown in the exemplary user interface shown in FIG. 10D. In an embodiment, the password is not visible on the screen and is replaced by any other character or symbol. For example, each typed character of the entered password is replaced a symbol '*'. In an embodiment, the entered password is not saved in the user device 302b and is sent to the OTP gateway server 316 through a communication channel established between the user device 302b and the OTP gateway server 316. In the embodiment, the password is sent to the OTP gateway server either a) character by character, as and when each character is entered by the user 302a or b) when the user 302a enters the complete password and presses the send button/icon.

Figure 10E:

The OTP gateway server compares the reply data message received from the registered mobile device against the response to the security question that has been retrieved from the issuer bank. In the present case, the reply data message matches the pre-stored response associated with the security question—thereby establishing that the user operating the registered mobile device is authorized to operate the payment account. Accordingly, the OTP gateway server transmits to the registered mobile device and initiates the process of displaying on the registered mobile device, a transaction OTP that can be used to authentication the payment transaction. As shown in the exemplary user interface shown in FIG. 10E, the OTP "864349" is displayed on the registered mobile device in response to the user providing the correct answer ("CHEWBACCA") to the security question ("WHAT WAS YOUR FIRST PET'S NAME").

Figure 10F:
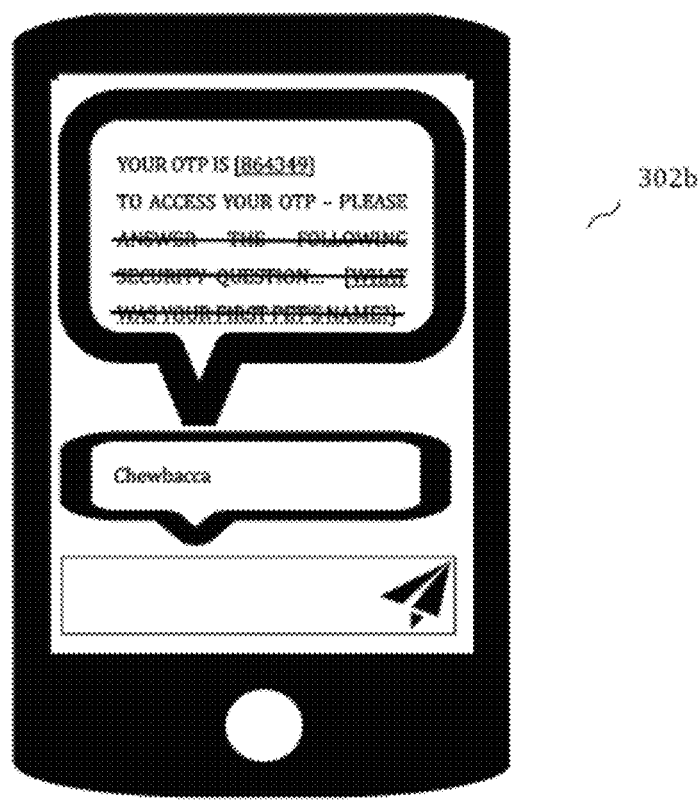

FIG. 10F illustrates another exemplary user interface that could be used for displaying the OTP on the registered mobile device in response to the user providing the correct answer ("CHEWBACCA") to the security question ("WHAT WAS YOUR FIRST PET'S NAME"). As shown in FIG. 10F, responsive to determining that the user has provided the correct answer, OTP gateway interfaces initiates display of the OTP ("864349") in a readable format on the registered mobile device display, in a manner where the readable OTP superimposes or substitutes the earlier displayed masked OTP ([XXXX]) on said display. As shown in FIG. 10F, display of the readable OTP on the registered mobile device may also be accompanied by deleting or striking out or otherwise cancelling the remaining part of the previously displayed security question—so that it is clear to the user that the identity verification process has been completed.

The user may thereafter use the displayed OTP to authenticate the ongoing payment transaction.

Figure 7:
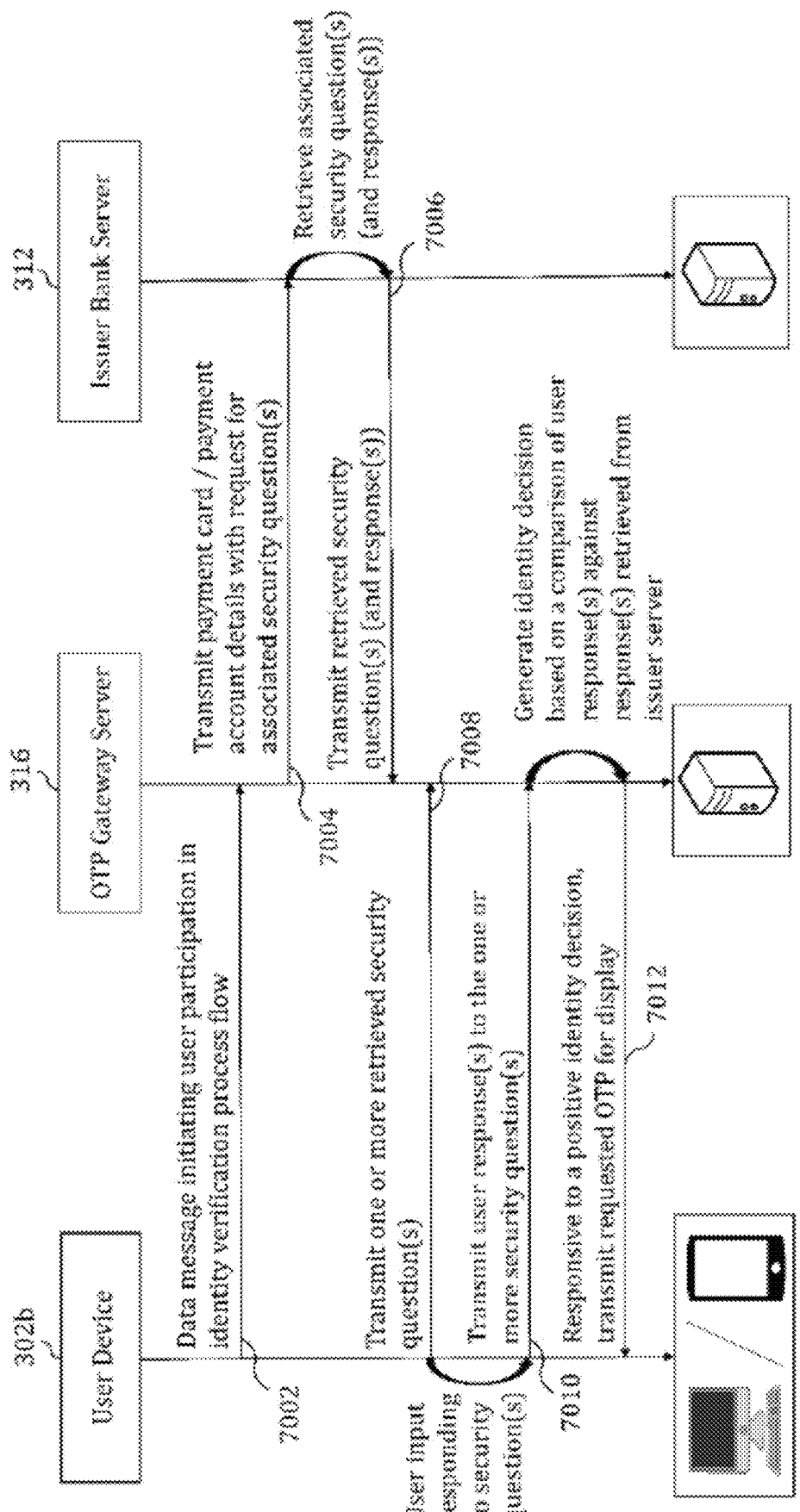
FIG. 7 is a communication flow diagram illustrating the communication flow between system entities for implementing the first identity authentication process flow in accordance with the present invention.

FIG. 7 is a communication flow diagram illustrating communication flow between system entities for implementing the method of FIG. 6, wherein the identity verification process flow illustrated in FIG. 6 is used for implementing the teachings of FIG. 4 and/or FIG. 5.

At step 7002, a data message initiating user participation in the identity verification process flow is received at OTP gateway server 316, from user device 302b. As discussed above, the data message initiating user participation in the identity verification process flow may be initiated at the user device 302b by a detectable action or event that may be initiated by the user 302a.

At step 7004, the OTP gateway server 316 transmits to the issuer bank server 312, payment card/payment account information corresponding to the pending payment transactions. The transmitted payment card/payment account information may be accompanied by a request for retrieval of one or more security questions and responses to the security questions that are associated with said payment card/payment account details.

Issuer bank server 312 retrieves the one or more security questions and responses to said security questions from a memory or database coupled with the issuer bank server 312, and at step 7006 transmits the retrieved security questions (and optionally the retrieved responses to the security questions) to the OTP gateway server 316.

At step 7006, the retrieved one or more security questions are transmitted to the user device 302b for identity verification of the user 302a.

The user 302a inputs or selects through input at the user device 302b, responses to the transmitted security question(s)—which responses are transmitted at step 7010 from the user device 302b back to the OTP gateway server 316.

An identity decision is thereafter generated based on results of a comparison between the responses to the security question(s) that are received from the user device 302b at step 7010, with responses to the security question(s) that have been retrieved by the issuer bank server 312.

Responsive to the generated identity decision comprising a positive identity decision, at step 7012 OTP data for display of an OTP corresponding to the requested payment transaction, is transmitted from the OTP gateway server 316 for display on the user device 302b.

Figure 8:
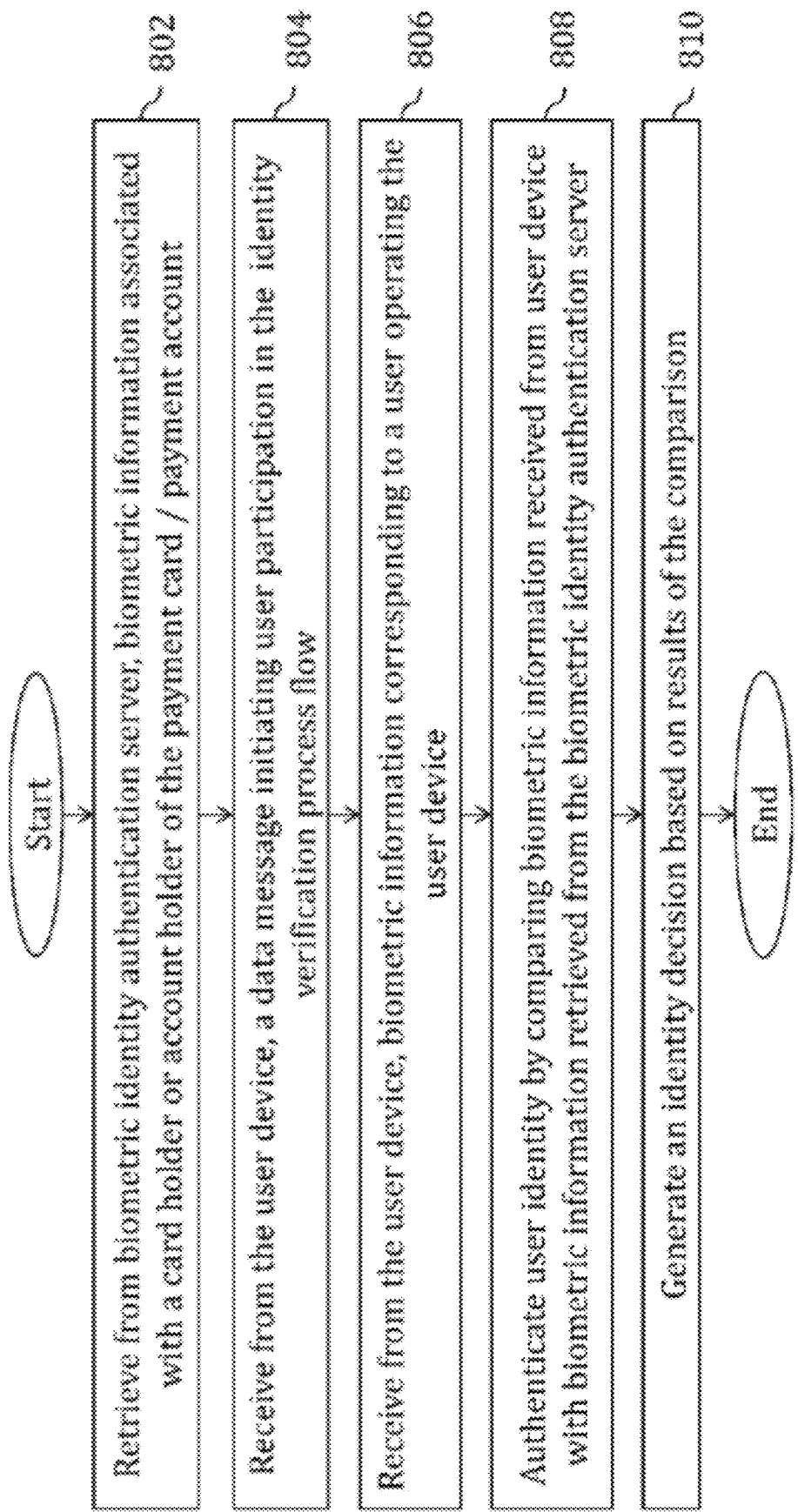
FIG. 8 is a flow chart illustrating a method for implementing a second identity authentication process flow in accordance with the present invention.

FIG. 8 illustrates a second identity verification process flow that may be used for implementing the teachings of FIG. 4 and/or FIG. 5. The identity verification process flow of FIG. 8 relies on biometric data of a card holder or account holder associated with a payment card/payment account that is being used for implementing a payment transaction. The biometric data has been previously stored and associated with said card holder or account holder and/or said payment card/payment account (for example, when onboarding the card holder or account holder into the issuer systems or when generating the payment card/payment account).

At step 802, biometric information associated with a card holder or account holder that is associated with the payment card or payment account with which a pending payment transaction is sought to be implemented, is received from a biometric authentication server (not shown in the figure) associated with issuer bank server 312 (or from issuer bank server 312 itself). The biometric information may comprise information corresponding to any one or more biometric features corresponding to the card holder or account holder that have been enrolled with the issuer bank server 312 or with the biometric authentication server that is associated with said issuer bank server 312. The biometric information and may include biometric information corresponding to any one or more of fingerprint, iris, retina, facial or infrared biometric characteristics of the authorized user. The biometric information received at step 802 may comprise i) one or more actual images of the biometric features, or ii) one or more biometric templates that have been generated based on data extracted from images of the biometric features and/or iii) one or more hashcodes or other digital values that have been generated based on data extracted from said biometric features.

At step 804 a data message initiating user participation in the identity verification process flow is received from the user device 302b. As discussed in connection with FIG. 4 above, the data message initiating user participation in the identity verification process flow may be initiated at the user device 302b by any detectable action or event that may be initiated by the user 302a. Detectable actions include without limitation, the user 302a pressing a specific key or button or specific portion of a touchscreen on the user device 302b, a shortpress or longpress event implemented through the user device 302b, sending an SMS or other data message from the user device 302b etc. The detectable action(s) may be performed in response to a data message previously sent to the user device 302b from the OTP gateway server 316 notifying the user 302a that a request for OTP generation has been received in connection with a payment card or payment account associated with the user 302a, and inviting the user 302a to complete an identity verification process (see for example, step 406 of FIG. 4).

At step 806, biometric information corresponding to the user 302a who is operating the user device 302b, is received from the user device 302b. The biometric information received from the user device 302b may comprise information corresponding to one or more biometric features of the user 302a that have been captured or imaged by one or more biometric sensors within or coupled with the user device 302b. In various embodiments, the received biometric information may correspond to any of fingerprint, iris, retina, facial or infrared biometric characteristics of the user 302a. The biometric information received at step 806 may comprise one or more of actual images of the biometric features, one or more biometric templates that have been generated based on data extracted from images of the biometric features and/or one or more hashcodes or other digital values that have been generated based on data extracted from said biometric features. In an embodiment, the biometric information at step 806 is received at any one of the OTP gateway server 316, or the issuer bank server 312 or a biometric authentication server that is associated with said issuer bank server 312.

At step 808 the identity of the user 302a is authenticated by comparing the biometric information (corresponding to the user 302a) that has been received at step 806 with biometric information associated with the card holder or account holder that has been retrieved at step 802. The comparison may be carried out at any of the OTP gateway server 316, the issuer bank server 312 or a biometric authentication server that is associated with said issuer bank server 312. In an embodiment, the comparison may be carried out at the user device 302b.

At step 810 an identity decision is generated based on results of the comparison at step 808. In the event the biometric information received from the user device 302b matches the biometric information retrieved at step 802, a positive identity decision (i.e. identity confirmation decision) is generated, whereas if the biometric information received from the user device 302b does not match the biometric information retrieved at step 802, a negative identity decision (i.e. identity not confirmed decision) is generated.

It would be understood that in the event of a positive identity decision generated at step 810 as a result of the identity verification process flow of FIG. 8, the OTP gateway server 316 would initiate display of an OTP corresponding to a requested payment transaction on the user device 302b (as discussed above in connection with step 408 of FIG. 4).

The method of FIG. 8 and its implementation within the method of FIG. 4, may be further understood in connection with the previously discussed example of a purchaser seeking to implement a payment transaction for purchase of a smartphone through an online merchant website using a payment account bearing payment account identifier number "ABCD".

As in the earlier discussed instance of this example, the purchaser initiates a payment workflow by providing to a merchant server, (i) a payment instruction to initiate payment of a specific transaction amount to the merchant, and (ii) payment account information. The payment account information may be input by the purchaser at a terminal device (e.g. terminal device 304) through which the online merchant website is being accessed. In this example, the payment account information input at the terminal device consists of the payment account identifier "ABCD" and optionally, a bank identifier that uniquely identifies an issuer bank with which the payment account is maintained. It would be understood that in certain embodiments, the bank identifier may comprise a part of the payment account identifier itself.

The payment instruction along with the payment account information may be transmitted to the issuer bank (e.g. issuer bank server 312) via one or more of a merchant server (e.g. merchant server 306), an acquirer bank server (acquirer bank server 308), and a network (e.g. payment network 310). Upon receipt of the payment instruction the issuer bank initiates a process flow for OTP generation—and transmits a request for OTP generation to an OTP gateway server (e.g. OTP gateway server 316).

The OTP gateway server responds to receiving the request for OTP generation by transmitting to a registered mobile device (e.g. user device 302b) associated with payment account "ABCD", a data message initiating an identity verification workflow. The data message comprises the following text by way of an SMS, flash message, USSD message or pop-up message, that is presented on a display of the registered mobile device:

"WE HAVE RECEIVED A PAYMENT INSTRUCTION ASSOCIATED WITH YOUR PAYMENT ACCOUNT. DO YOU WISH TO PROCEED WITH IDENTITY VERIFICATION.
IF YES TAKE ACTION "A". IF NO TAKE ACTION "B".

Figure 10G:

Responsive to the user (e.g. user 302a) who is operating registered mobile device deciding to proceed with the identity verification process, such user would initiate action "A" at the registered mobile device—for example, pressing a "Yes" or "Continue" button, or any other action signifying consent. If the user initiates action "A", the OTP gateway server next retrieves from the issuer bank server, biometric information associated with an authorized user of the payment account ABCD. In this example, the retrieved biometric information is fingerprint biometric characteristics associated with the user. The OTP gateway server then transmits to the registered mobile device, a data message comprising the following text by way of an SMS, flash message, USSD message or pop-up message, for display of the registered mobile device, in the manner illustrated in the exemplary user interface shown in FIG. 10G:

YOUR OTP IS [XXXX] . . . .
TO VIEW YOUR OTP—PLEASE VERIFY YOUR IDENTITY WITH YOUR FINGERPRINT

Again, it will be noted that the actual OTP is not displayed within the message, and [XXXX] within the data message is simply a masked OTP, pixelated OTP, encoded OTP, encrypted OTP or any other representation of an OTP that does not allow a viewer to correctly or fully read the OTP.

The user operating the registered mobile device responds to this data message in in the manner by presenting one of his finger surfaces at a fingerprint biometric reader or sensor that is coupled with or integrated into the registered mobile device—and allows the reader or sensor to acquire fingerprint information corresponding to the presented finger surface. The biometric characteristic information corresponding to the fingerprint information acquired by the reader or sensor is then matched against the biometric characteristic information that has been retrieved from the issuer bank server. In an embodiment, the matching or comparison step is carried out at the OTP gateway server or at a server communicably coupled with the OTP gateway server.

Figure 10H:

In the present example, the fingerprint biometric characteristics of the fingerprint presented to the reader or sensor in the registered mobile device matches the fingerprint biometric characteristics retrieved from the issuer bank server—thereby establishing that the user operating the registered mobile device is authorized to operate the payment account. Accordingly, the OTP gateway server transmits to the registered mobile device and initiates the process of displaying on the registered mobile device, a transaction OTP that can be used to authentication the payment transaction. As shown in the exemplary user interface shown in FIG. 10H, the OTP "864349" is displayed on the registered mobile device as a pop-up message that is displayed on a screen or display of the registered mobile device.

The user may thereafter use the displayed OTP to authenticate the ongoing payment transaction.

Figure 9:
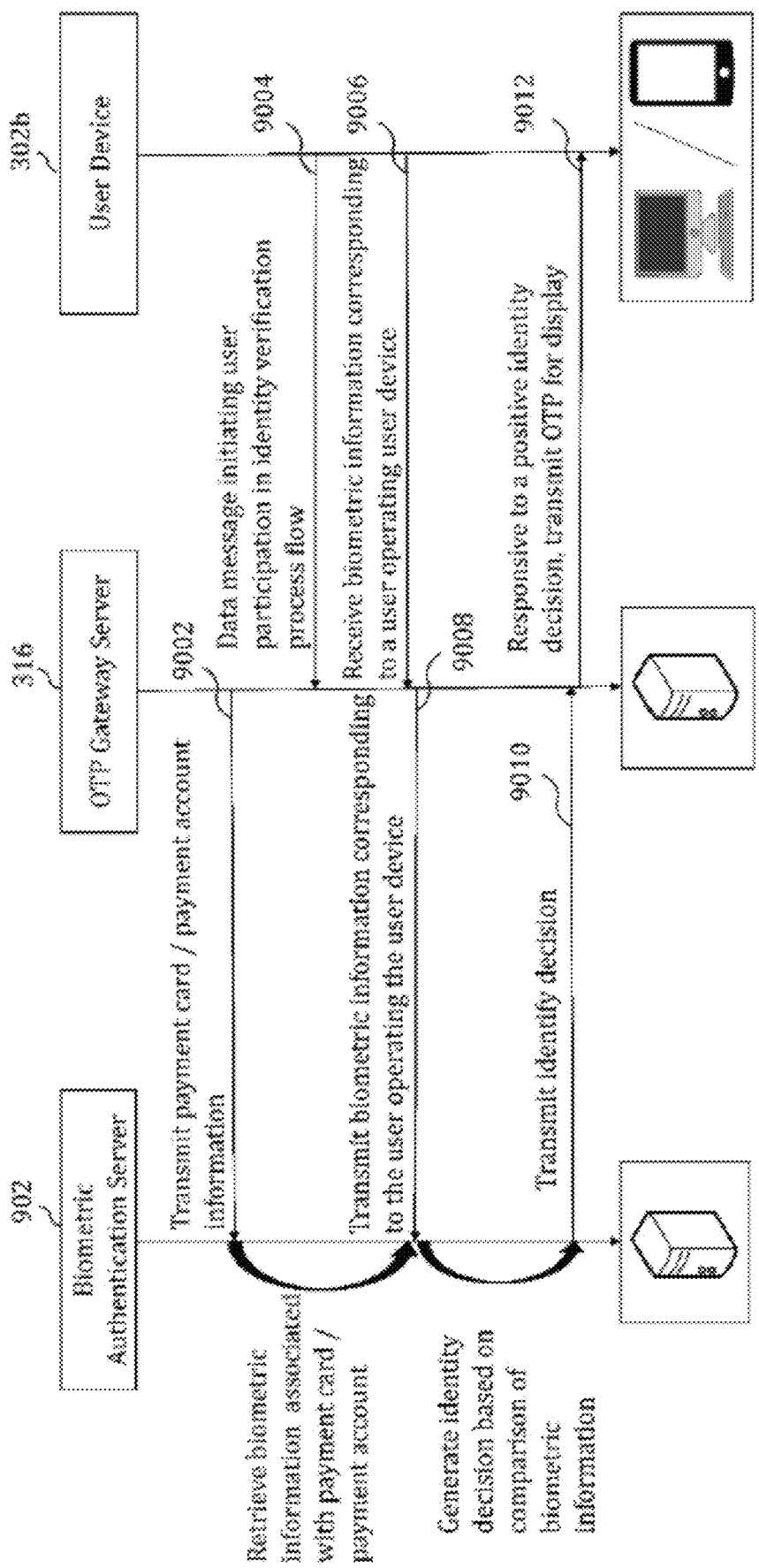
FIG. 9 is a communication flow diagram illustrating the communication flow between system entities for implementing the second identity authentication process flow in accordance with the present invention.

FIG. 9 is a communication flow diagram illustrating communication flow between system entities for implementing the method of FIG. 8, wherein the identity verification process flow illustrated in FIG. 8 is used for implementing the teachings of FIG. 4 and/or FIG. 5.

At step 9002 the OTP gateway server 316 transmits to a biometric authentication server 902 that is associated with the issuer server 312, information identifying a payment card or payment account with which a pending payment transaction is sought to be implemented. The biometric authentication server 902 uses the received payment card or payment account information to retrieve biometric information associated with the identified payment card or payment account (i.e. biometric information corresponding to a card holder or account holder associated with the identified payment card or payment account).

At step 9004, the OTP gateway server 316 receives from the user device 302b, a data message initiating user participation in the identity verification process flow. As discussed in connection with FIG. 4 above, the data message initiating user participation in the identity verification process flow may be initiated at the user device 302b by any detectable action or event that may be initiated by the user 302a. The detectable action or event may be in response to a data message previously sent to the user device 302b from OTP gateway server 316 notifying the user 302a that a request for OTP generation has been received in connection with a payment card or payment account associated with the user 302a. The data message previously sent to the user device 302b from OTP gateway server 316 invites the user 302a to complete an identity verification process (see for example, step 406 of FIG. 4) to obtain access to the requested OTP.

At step 9006 the OTP gateway server receives from the user device 302b, biometric information corresponding to the user 302a that is operating the user device 302b. The biometric information received from the user device 302b may comprise information corresponding to one or more biometric features of the user 302a that have been captured or imaged by one or more biometric sensors within the user device 302b. In various embodiments, the received biometric information may correspond to any of fingerprint, iris, retina, facial or infrared biometric characteristics of the user 302a. As discussed in connection with FIG. 8 above, the biometric information received at step 9006 may comprise one or more of actual images of the biometric features, one or more biometric templates that have been generated based on data extracted from images of the biometric features and/or one or more hashcodes or other digital values that have been generated based on data extracted from said biometric features.

The received biometric information corresponding to the user 302a is transmitted from the OTP gateway server 316 to the biometric authentication server 902.

The biometric authentication server 902 thereafter authenticates the identity of the user 302a by comparing the biometric information (corresponding to the user 302a) that has been received at step 9008 with the retrieved biometric information that is associated with the payment card or payment account information previously received at step 9002. The comparison may be carried out based on any one or more methods or techniques for biometric feature comparison that would be apparent to the skilled person. The comparison at the biometric authentication server 902 results in generation of an identity decision based on results of the comparison. In the event the biometric information received from the user device 302b matches the biometric information associated with the card holder or account holder of the payment card or payment account, a positive identity decision (i.e. identity confirmation decision) is generated. If the biometric information received from the user device 302b does not match the biometric information associated with the card holder or account holder of the payment card or payment account, a negative identity decision (i.e. identity not confirmed decision) is generated.

At step 9010, the generated identity decision is transmitted from the biometric authentication server 902 to the OTP gateway server 316.

Responsive to the generated identity decision comprising a positive identity decision, at step 9012 the OTP gateway server 316 transmits to the user device 302b, OTP data for effecting display of an OTP corresponding to the requested payment transaction, on the user device 302b.

FIG. 10A illustrates an embodiment of the OTP gateway server 316 that is configured to implement the methods of the present invention.

The OTP gateway server 316 as illustrated and discussed above, may comprise any processor based system or server configured for data processing operations and network based communication. In specific embodiments, OTP gateway server 316 may comprise one or more servers. The OTP gateway server 316 may include (i) an operator interface 3162 configured to enable an operator to configure or control the OTP gateway server 316, (ii) a processor 3164 configured for data processing operations within the OTP gateway server 316, (iii) a transceiver 3166 configured for enabling network communication to and from the OTP gateway server 316, and (iv) a memory 3168, which memory 3168 may include transitory memory and/or non-transitory memory.

In an exemplary embodiment, the memory 3168 may have stored therewithin one or more of (i) an operating system 3170 configured for managing device hardware and software resources and that provides common services for software programs implemented within the OTP gateway server 316, (ii) an identity verification process controller 3172 that is configured to implement and control one or more of the identity verification process flows that are described above in connection with FIGS. 6 to 9 above, (iii) an issuer security server interface 3174 configured to communicate with the issuer bank server 312 or with a security server associated with or communicably coupled with the issuer bank server 312 for the purposes of retrieving and comparing responses to security questions that have been associated with a payment card or payment account against responses to said security questions that have been received from a user 302a operating the user device 302b, (iv) a biometric authentication server interface 3176 configured to communicate with the issuer server 312 or with a biometric authentication server associated with the issuer bank server 312 for the purposes of retrieving and comparing biometric information that has been associated with a card holder or account holder of a payment card or payment account, against biometric information that has been received from the user 302a operating the user device 302b, (v) an OTP server interface 3178 configured to communicate with the OTP authentication server 314a for the purpose of retrieving an OTP generated by the OTP authentication server 314a for the purposes of payment transaction implementation, and (vi) an OTP communication controller 3180 configured to control and implement transmission of an OTP received from the OTP authentication server 314, to the user device 302b, responsive to a prior determination that the user 302a who is operating the user device 302b is in fact authorized to use or implement payment transactions through a payment card or payment account that has been presented for the purpose of an ongoing payment transaction.

It will be understood that the OTP gateway server 316 as illustrated in FIG. 10A may be configured to implement one or more of the method steps and process flows discussed above in connection with FIGS. 6 to 9.

Additionally, in various embodiments of the method steps and process flows discussed above in connection with FIGS. 6 to 9, the OTP is generated or is transmitted to the user device for display (i) prior to initiation of the identity verification process, or (ii) during implementation of the identity verification process, or (iii) subsequent to the identity verification decision confirming that the user operating the user device is an authorized user of the payment account.

Figure 11:
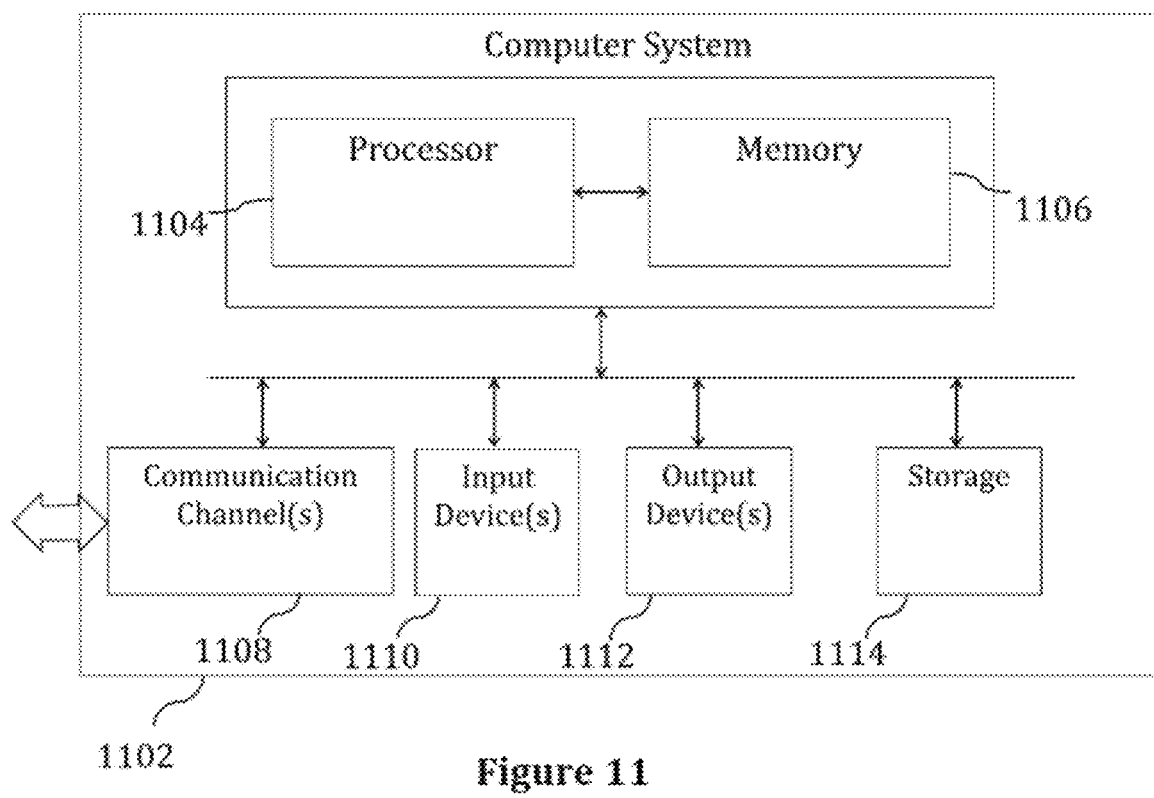
FIG. 11 illustrates an exemplary computer system of a type that may be used to implement the teachings of the present invention.

FIG. 11 illustrates an exemplary computer system 1102 for implementing the present invention.

Computer system 1102 comprises one or more processors 1104 and at least one memory 1106. Processor 1104 is configured to execute program instructions—and may be a real processor or a virtual processor. It will be understood that computer system 1102 does not suggest any limitation as to scope of use or functionality of described embodiments. The computer system 1102 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1102 in accordance with the present invention may include one or more servers, desktops, laptops, tablets, smart phones, mobile phones, mobile communication devices, phablets and personal digital assistants. In an embodiment of the present invention, the memory 1106 may store software for implementing various embodiments of the present invention. The computer system 1102 may have additional components. For example, the computer system 1102 may include one or more communication channels 1108, one or more input devices 1110, one or more output devices 1112, and storage 1114. An interconnection mechanism (not shown) such as a bus, controller, or network, interconnects the components of the computer system 1102. In various embodiments of the present invention, operating system software (not shown) provides an operating environment for various softwares executing in the computer system 1102 using a processor 1104, and manages different functionalities of the components of the computer system 1102.

The communication channel(s) 1108 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1110 may include, but is not limited to, a touch screen, a keyboard, mouse, pen, joystick, trackball, a voice device, a scanning device, or any another device that is capable of providing input to the computer system 1102. In an embodiment of the present invention, the input device(s) 1110 may be a sound card or similar device that accepts audio input in analog or digital form. The output device(s) 1112 may include, but not be limited to, a user interface on CRT, LCD, LED display, or any other display associated with any of servers, desktops, laptops, tablets, smart phones, mobile phones, mobile communication devices, phablets and personal digital assistants, printer, speaker, CD/DVD writer, or any other device that provides output from the computer system 1102.

The storage 1114 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1102. In various embodiments of the present invention, the storage 1114 may contain program instructions for implementing any of the described embodiments.

In an embodiment of the present invention, the computer system 1102 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1102. The method described herein is typically implemented as a computer program product, comprising a set of program instructions that is executed by the computer system 1102 or any other similar device. The set of program instructions may be a series of computer readable codes stored on a tangible medium, such as a computer readable storage medium (storage 1114), for example, diskette, CD-ROM, ROM, flash drives or hard disk, or transmittable to the computer system 1102, via a modem or other interface device, over either a tangible medium, including but not limited to optical or analogue communications channel(s) 1108. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

We claim:

1. A method for securing a payment transaction one-time-password (OTP), the method including:
   receiving a request to generate an OTP for completion of a payment transaction associated with a payment account;
   transmitting to a user device associated with the payment account, a data message that initiates an identity verification process for verification of identity of a user operating the user device, wherein the identity verification process includes:
      receiving one or more user inputs from a user of the user device; and
      generating an identity verification decision based on the received one or more user inputs and the identity verification process for verification of identity of the user operating the user device, wherein the identity verification decision determines whether the user of the user device is an authorized user of the payment account; and
   responsive to the identity verification decision confirming that the user operating the user device is the authorized user of the payment account, displaying the OTP at the user device for implementation of the payment transaction, wherein the OTP is generated or is transmitted to the user device for display prior to initiation of the identity verification process or during implementation of the identity verification process.

2. The method as claimed in claim 1, wherein the identity verification process includes:
   retrieving one or more security questions associated with the payment account;
   transmitting the retrieved one or more security questions to the user device;
   receiving through the one or more user inputs, an answer to the one or more security questions;
   comparing the received answer against pre-stored responses to the one or more security questions; and
   generating the identity verification decision based on results of said comparison.

3. The method as claimed in claim 1, wherein:
   the received one or more user inputs provides biometric information corresponding to one or more biometric characteristics of the user operating the user device; and
   the identity verification process includes:
      retrieving biometric characteristics information associated with the payment account;
      comparing the biometric information corresponding to biometric characteristics of the user operating the user device against the retrieved biometric characteristics information; and
      generating the identity verification decision based on results of said comparison.

4. The method as claimed in claim 3, wherein the biometric information corresponding to one or more biometric characteristics of the user operating the user device corresponds to information captured by one or more sensors incorporated within or coupled with the user device.

5. The method as claimed in claim 1, wherein displaying the generated OTP for implementation of the payment transaction includes:
   transmitting the generated OTP to the user device; and
   displaying the OTP on a display of the user device.

6. The method as claimed in claim 5, wherein the displayed generated OTP is excluded from storage within non-transitory memory of the user device.

7. The method as claimed in claim 5, wherein the transmitted generated OTP is stored exclusively within transitory memory of the user device.

8. The method as claimed in claim 5, wherein the generated OTP is subsequently deleted from one or both of transitory memory and non-transitory memory of the user device after the OTP has been displayed on the display of the user device.

9. A system for securing a payment transaction one-time-password (OTP), the system including:
   a processor implemented OTP gateway server configured for:
      receiving a request to generate an OTP for completion of a payment transaction associated with a payment account;
      transmitting to a user device associated with the payment account, a data message that initiates an identity verification process for verification of identity of a user operating the user device, wherein the identity verification process includes:
         receiving one or more user inputs from a user of the user device; and
         generating an identity verification decision based on the received one or more user inputs and on the identity verification process for verification of identity of the user operating the user device, wherein the identity verification decision determines whether the user of the user device is an authorized user of the payment account; and
      responsive to the identity verification decision confirming that the user operating the user device is the authorized user of the payment account, displaying the OTP at the user device for implementation of the payment transaction, wherein the OTP is generated or is transmitted to the user device for display prior to initiation of the identity verification process or during implementation of the identity verification process.

10. The system as claimed in claim 9, wherein the identity verification process includes:
    retrieving from a security server associated with an issuer of the payment account, one or more security questions associated with the payment account;
    transmitting the retrieved one or more security questions to the user device;

receiving through the one or more user inputs, an answer to the one or more security questions;

comparing the received answer against pre-stored responses to the one or more security questions that are retrieved from the security server; and generating the identity verification decision based on results of said comparison.

11. The system as claimed in claim 9, wherein:

the received one or more user inputs provides biometric information corresponding to one or more biometric characteristics of the user operating the user device; and the identity verification process includes:

retrieving from a biometric authentication server associated with an issuer of the payment account, biometric characteristics information associated with the payment account;

comparing the biometric information corresponding to biometric characteristics of the user operating the user device against the biometric characteristics information retrieved from the biometric authentication server; and generating the identity verification decision based on results of said comparison.

12. The system as claimed in claim 11, wherein the biometric information corresponding to one or more biometric characteristics of the user operating the user device corresponds to information captured by one or more sensors incorporated within or coupled with the user device.

13. The system as claimed in claim 9, wherein displaying the OTP generated for implementation of the payment transaction includes:

transmitting OTP information to the user device; and displaying the OTP on a display of the user device.

14. The system as claimed in claim 13, wherein the transmitted OTP information is excluded from storage within non-transitory memory of the user device.

15. The system as claimed in claim 13, wherein the transmitted OTP information is stored exclusively within transitory memory of the user device.

16. The system as claimed in claim 13, wherein the OTP information is subsequently deleted from one or both of transitory memory and non-transitory memory of the user device after the OTP has been displayed on the display of the user device.

17. A computer program product for securing a payment transaction one-time-password (OTP), including a non-transitory computer usable medium having computer readable program code embodied therein, the computer readable program code including instructions for implementing the steps of:

receiving a request to generate an OTP for completion of a payment transaction associated with a payment account;

transmitting to a user device associated with the payment account, a data message that initiates an identity verification process for verification of identity of a user operating the user device, wherein the identity verification process includes:

receiving one or more user inputs from a user of the user device; and generating an identity verification decision based on the received one or more user inputs and on the identity verification process for verification of identity of the user operating the user device, wherein the identity verification decision determines whether the user of the user device is an authorized user of the payment account; and responsive to the identity verification decision confirming that the user operating the user device is the authorized user of the payment account, displaying the OTP at the user device for implementation of the payment transaction; and generating the OTP either prior to the initiation of the identity process or during implementation of the identity process.

* * * * *